(12) United States Patent
Huang et al.

(10) Patent No.: US 11,109,363 B2
(45) Date of Patent: Aug. 31, 2021

(54) METHOD AND APPARATUS FOR TRANSMITTING DEVICE-TO-DEVICE SIDELINK REPORT IN A WIRELESS COMMUNICATION SYSTEM

(71) Applicant: ASUSTek Computer Inc., Taipei (TW)

(72) Inventors: Chun-Wei Huang, Taipei (TW); Ming-Che Li, Taipei (TW); Yi-Hsuan Kung, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 17/077,362

(22) Filed: Oct. 22, 2020

(65) Prior Publication Data
US 2021/0136742 A1 May 6, 2021

Related U.S. Application Data

(60) Provisional application No. 62/928,942, filed on Oct. 31, 2019.

(51) Int. Cl.
*H04W 28/04* (2009.01)
*H04W 72/04* (2009.01)
(Continued)

(52) U.S. Cl.
CPC ....... *H04W 72/0406* (2013.01); *H04L 1/1812* (2013.01)

(58) Field of Classification Search
CPC ... H04W 28/04; H04W 72/04; H04W 72/042; H04W 88/08; H04L 5/0007
(Continued)

(56) References Cited

U.S. PATENT DOCUMENTS

| 2016/0066337 A1* | 3/2016 | Sartori | H04W 72/0406 370/329 |
| 2016/0135217 A1* | 5/2016 | Lee | H04L 47/30 370/329 |

(Continued)

FOREIGN PATENT DOCUMENTS

| CN | 111132036 | 5/2020 | |
| WO | 2020068973 | 4/2020 | |
| WO | WO 2020/068973 A1 * | 4/2020 | ............... H04L 1/18 |

OTHER PUBLICATIONS

European Search Report in corresponding EP Application No. 20203235.5 dated Mar. 24, 2021.
(Continued)

*Primary Examiner* — Peter G Solinsky
*Assistant Examiner* — Sanjay K Dewan
(74) *Attorney, Agent, or Firm* — Blue Capital Law Firm, P.C.

(57) ABSTRACT

A method and apparatus are disclosed from the perspective of a first device for performing sidelink communication. In one embodiment, the first device includes a MAC CE in a MAC PDU, wherein if the MAC PDU comprises the MAC CE without data, SL HARQ feedback is disabled for the MAC PDU. The first device further includes sidelink data associated with a first sidelink logical channel in the MAC PDU, wherein the first sidelink logical channel is configured to enable sidelink HARQ feedback. The first device also sets or indicates enable SL HARQ feedback for the MAC PDU in a SCI, wherein the SCI schedules a sidelink transmission delivering the MAC PDU. Furthermore, the first device transmits the SCI and performs the sidelink transmission to a second device.

20 Claims, 12 Drawing Sheets

(51) Int. Cl.
*H04W 88/08* (2009.01)
*H04L 5/00* (2006.01)
*H04L 1/18* (2006.01)

(58) Field of Classification Search
USPC .......................................................... 370/329
See application file for complete search history.

(56) References Cited

U.S. PATENT DOCUMENTS

| | | | |
|---|---|---|---|
| 2017/0127251 A1* | 5/2017 | Yi | H04W 28/0278 |
| 2017/0238337 A1* | 8/2017 | Lee | H04W 72/14 |
| | | | 370/329 |
| 2017/0289908 A1* | 10/2017 | Lee | H04W 52/0219 |
| 2018/0049129 A1* | 2/2018 | Li | H04W 74/0816 |
| 2018/0054755 A1* | 2/2018 | Lee | H04W 28/0278 |
| 2018/0139724 A1* | 5/2018 | Loehr | H04W 72/02 |
| 2018/0263019 A1* | 9/2018 | Jung | H04W 72/04 |
| 2018/0324882 A1* | 11/2018 | Gulati | H04W 76/14 |
| 2019/0020987 A1* | 1/2019 | Khoryaev | H04W 72/042 |
| 2019/0098649 A1* | 3/2019 | Baghel | H04W 72/1257 |
| 2019/0182859 A1* | 6/2019 | Khoryaev | H04L 1/0013 |
| 2020/0022089 A1* | 1/2020 | Guo | H04W 52/383 |
| 2020/0136760 A1 | 4/2020 | Hahn et al. | |
| 2020/0228247 A1* | 7/2020 | Guo | H04L 5/0048 |
| 2020/0275412 A1* | 8/2020 | Kim | H04W 72/02 |
| 2020/0323023 A1* | 10/2020 | Miao | H04W 28/04 |
| 2020/0351033 A1* | 11/2020 | Ryu | H04W 72/0453 |
| 2020/0351067 A1* | 11/2020 | Hui | H04L 5/001 |
| 2020/0351833 A1* | 11/2020 | Chae | H04W 52/242 |
| 2020/0351959 A1* | 11/2020 | Lee | H04W 80/02 |
| 2020/0351975 A1* | 11/2020 | Tseng | H04L 5/0092 |

OTHER PUBLICATIONS

Ericsson: "PHY layer procedures for NR sidelink", 3GPP Draft: R1-1910538 Ericsson-Phy Layer Procedures for NR Sidelink, 3rd Generation Partnership Project (3GPP), Mobile Competence Centre; 650, Route Des Lucioles; F-06921 Sophia-Antipolis Cedex; vol. Ran WG1, No. Chongqing, China; Oct. 14, 2019-Oct. 20, 2019, Oct. 7, 2019, XP051808939.
NTT Docomo, Inc. "Sidelink Physical Layer Procedure for NR V2X", Agenda Item 7.2.4.5, Discussion and Decision, R1-1911173, 3GPP TSG RAN WG1 #98bis, Chongqing, China, Oct. 14-20, 2019.
Huawei, HiSilicon, "Sidelink Physical Layer Procedures for NR V2X", Discussion and Decision, R1-1910059, 3GPP TSG RAN WG1 Meeting #98bis, Chongqing, China, Oct. 14-20, 2019.

* cited by examiner

| DCI format | Search Space |
|---|---|
| DCI format 5A | For PDCCH: Common and UE specific by C-RNTI |
| | For EPDCCH: UE specific by C-RNTI |

FIG. 5 (PRIOR ART)

| SL index field in DCI format 5A | Indicated value $m$ |
|---|---|
| '00' | 0 |
| '01' | 1 |
| '10' | 2 |
| '11' | 3 |

FIG. 6 (PRIOR ART)

| Resource reservation field in SCI format 1 | Indicated value X | Condition |
|---|---|---|
| '0001', '0010', ..., '1010' | Decimal equivalent of the field | The higher layer decides to keep the resource for the transmission of the next transport block and the value X meets $1 \leq X \leq 10$. |
| '1011' | 0.5 | The higher layer decides to keep the resource for the transmission of the next transport block and the value X is 0.5. |
| '1100' | 0.2 | The higher layer decides to keep the resource for the transmission of the next transport block and the value X is 0.2. |
| '0000' | 0 | The higher layer decides not to keep the resource for the transmission of the next transport block. |
| '1101', '1110', '1111' | Reserved | |

FIG. 7 (PRIOR ART)

| (LCH) data | HARQ-ACK Enable | HARQ-ACK Disable |
| MAC CE (e.g., RSRP report or SL CSI-report) | Enable | Disable |
| HARQ-ACK Enable | | |
| HARQ-ACK Disable | | |

FIG. 8

METHOD AND APPARATUS FOR TRANSMITTING DEVICE-TO-DEVICE SIDELINK REPORT IN A WIRELESS COMMUNICATION SYSTEM

CROSS-REFERENCE TO RELATED APPLICATIONS

The present Application claims the benefit of U.S. Provisional Patent Application Ser. No. 62/928,942 filed on Oct. 31, 2019, the entire disclosure of which is incorporated herein in their entirety by reference.

FIELD

This disclosure generally relates to wireless communication networks, and more particularly, to a method and apparatus for transmitting device-to-device sidelink report in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and apparatus are disclosed from the perspective of a first device for performing sidelink communication. In one embodiment, the first device includes a MAC CE in a MAC PDU, wherein if the MAC PDU comprises the MAC CE without data, SL HARQ feedback is disabled for the MAC PDU. The first device further includes sidelink data associated with a first sidelink logical channel in the MAC PDU, wherein the first sidelink logical channel is configured to enable sidelink HARQ feedback. The first device also sets or indicates enable SL HARQ feedback for the MAC PDU in a SCI, wherein the SCI schedules a sidelink transmission delivering the MAC PDU. Furthermore, the first device transmits the SCI and performs the sidelink transmission to a second device.

BRIEF DESCRIPTION OF THE DRAWINGS

FIG. 5 is a reproduction of Table 14.2-2 of 3GPP TS 36.213 V15.4.0.

FIG. 6 is a reproduction of Table 14.2.1-1 of 3GPP TS 36.213 V15.4.0.

FIG. 7 is a reproduction of Table 14.2.1-2 of 3GPP TS 36.213 V15.4.0.

FIG. 8 is a diagram according to one exemplary embodiment.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems devices described below may be designed to support one or more standards such as the standard offered by a consortium named "3rd Generation Partnership Project" referred to herein as 3GPP, including: TS 36.213 V15.4.0 (2018-December), "E-UTRA; Physical layer procedures (Release 15)"; TS 36.212 V15.4.0 (2018-December), "E-UTRA); Physical layer; Multiplexing and channel coding (Release 15)"; TS 36.211 V15.4.0 (2018-December), "E-UTRA); Physical layer; Physical channels and modulation (Release 15)"; TS 36.214 V15.3.0 (2018-September), "E-UTRA); Physical layer; Measurements (Release 15)"; RP-182111, "Revised SID: Study on NR V2X", LG Electronics; R1-1810051, "Final Report of 3GPP TSG RAN WG1 #94 v1.0.0 (Gothenburg, Sweden, 20-24 Aug. 2018)"; R1-1812101, "Final Report of 3GPP TSG RAN WG1 #94bis v1.0.0 (Chengdu, China, 8-12 Oct. 2018)"; R1-1901482, "Final Report of 3GPP TSG RAN WG1 #95 v0.1.0 (Spokane, USA, 12-16 Nov. 2018)"; R1-1901483, "Final Report of 3GPP TSG RAN WG1 #AH_1901 v1.0.0 (Taipei, Taiwan, 21-25 Jan. 2019)"; R1-1905837, "Final Report of 3GPP TSG RAN WG1 #96 v2.0.0 (Athens, Greece, 25 February-1 Mar. 2019)"; R1-1905921, "Final Report of 3GPP TSG RAN WG1 #96bis v1.0.0 (Xi'an, China, 8-12 Apr. 2019)"; Draft Report of 3GPP TSG RAN WG1 #97 V0.1.0 (Reno, USA, 13-17 May 2019); Draft Report of 3GPP TSG RAN WG1 #98 V0.1.0 (Prague, Czech, 26-30 Aug. 2019); R1-1908917, "PHY layer procedures for NR sidelink", Ericsson; Draft Report of 3GPP TSG RAN WG1 #98bis V0.1.0 (Chongqing, China, 14-20 Oct. 2019); and TS 36.321 V15.7.0, "EUTRA, Medium Access Control (MAC)

protocol specification (Release 15)". The standards and documents listed above are hereby expressly incorporated by reference in their entirety.

Figure 1:
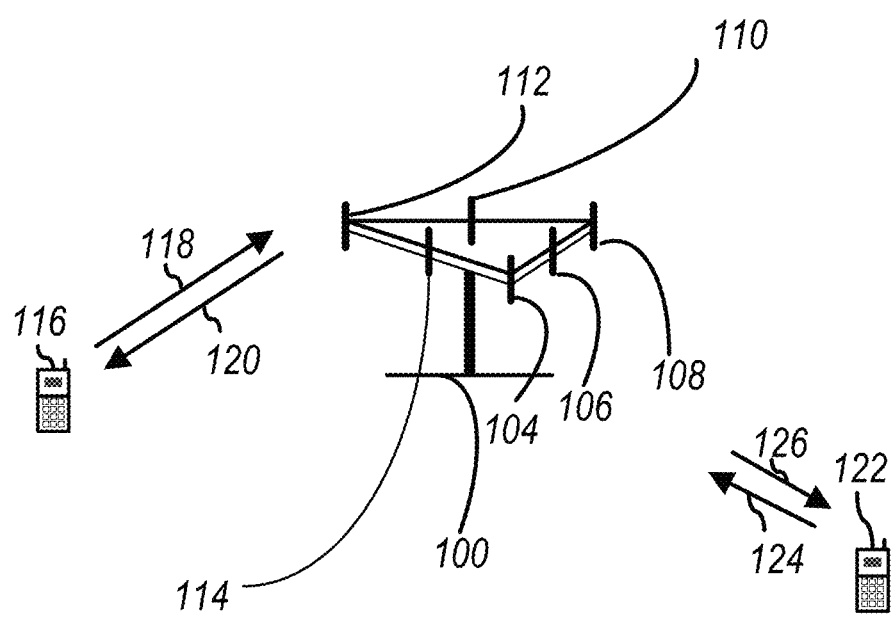
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
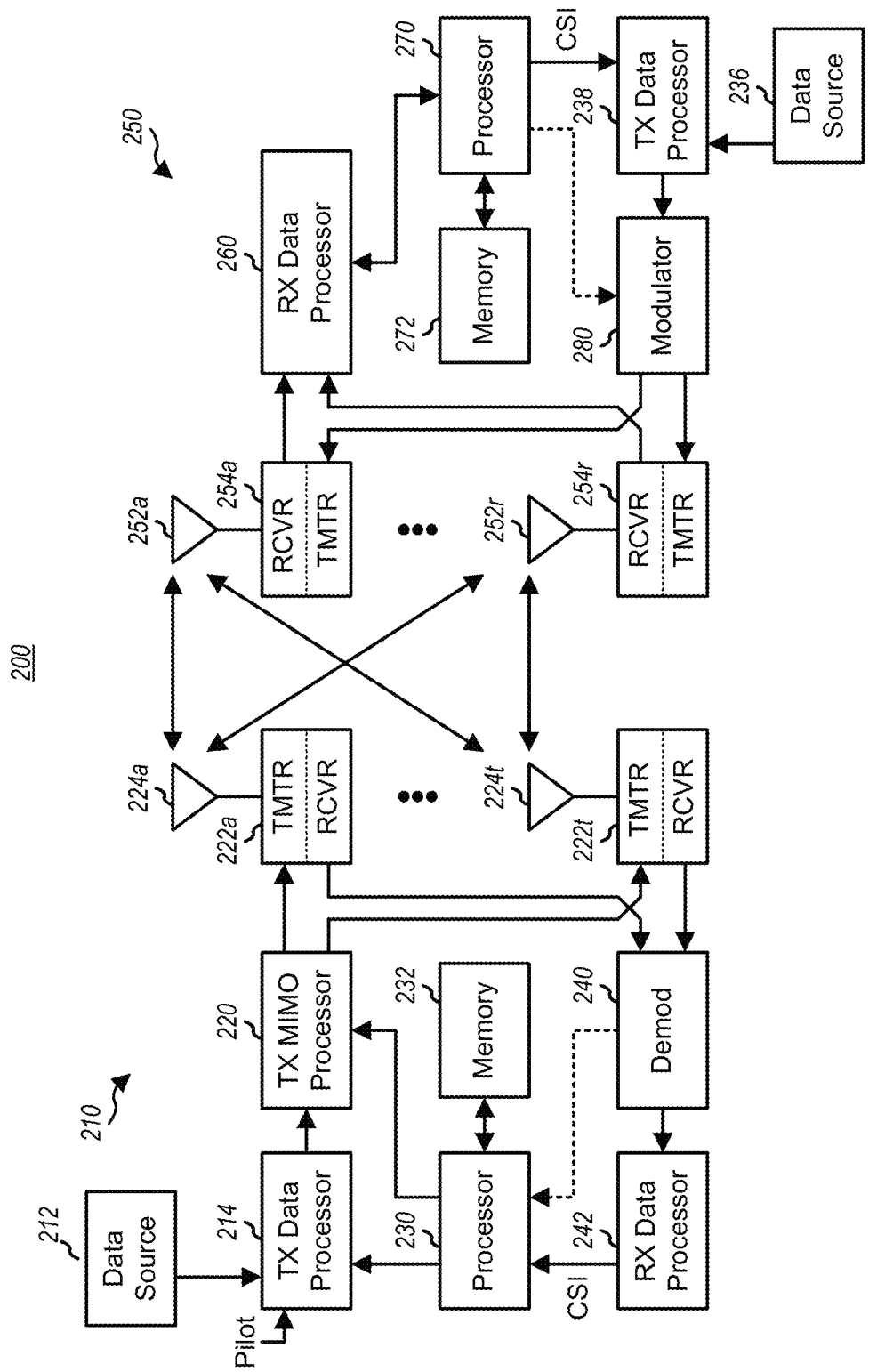
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
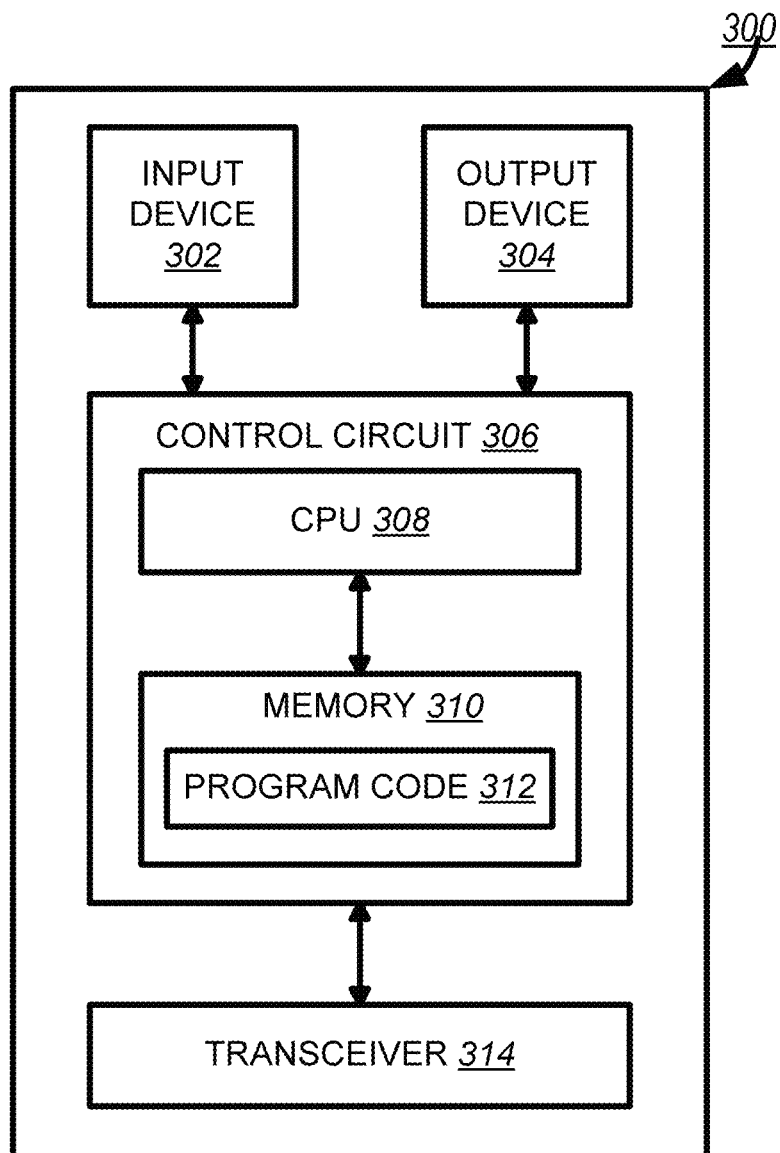
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
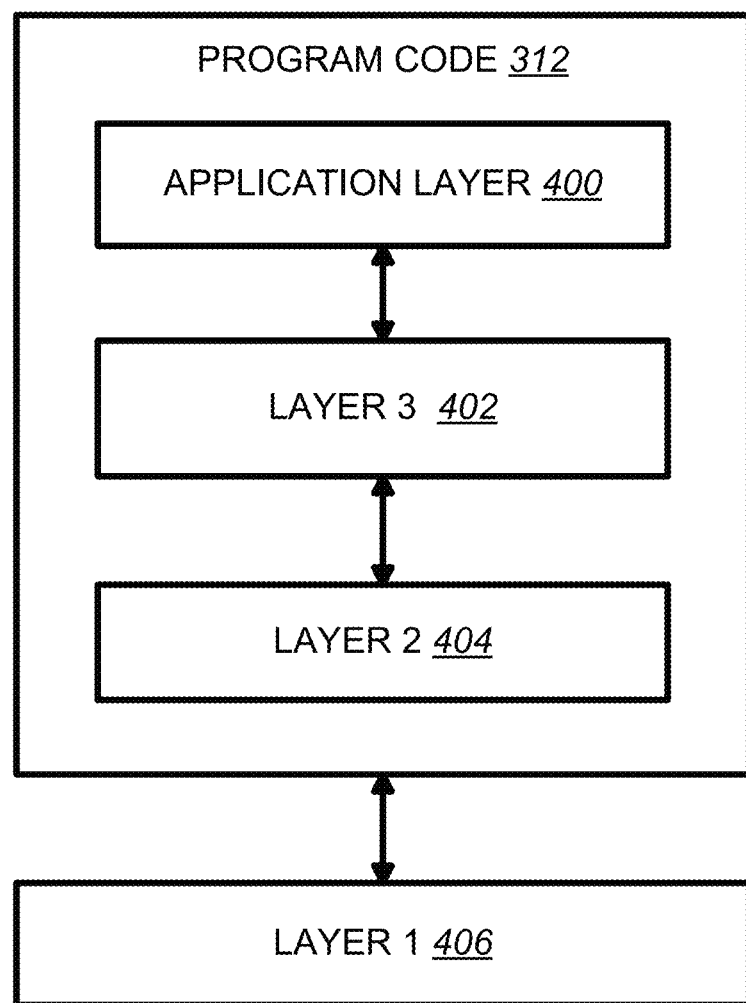
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP TS 36.213 specifies the UE procedure for V2X transmission in LTE/LTE-A. The V2X transmissions are performed as sidelink transmission mode 3 or sidelink transmission mode 4 as follows:

14 UE Procedures Related to Sidelink

A UE can be configured by higher layers with one or more PSSCH resource configuration(s). A PSSCH resource configuration can be for reception of PSSCH, or for transmission of PSSCH. The physical sidelink shared channel related procedures are described in Subclause 14.1.

A UE can be configured by higher layers with one or more PSCCH resource configuration(s). A PSCCH resource configuration can be for reception of PSCCH, or for transmission of PSCCH and the PSCCH resource configuration is associated with either sidelink transmission mode 1, 2, 3 or sidelink transmission mode 4. The physical sidelink control channel related procedures are described in Subclause 14.2.

[ . . . ]

14.1 Physical Sidelink Shared Channel Related Procedures 14.1.1 UE Procedure for Transmitting the PSSCH

[ . . . ]

If the UE transmits SCI format 1 on PSCCH according to a PSCCH resource configuration in subframe n, then for the corresponding PSSCH transmissions of one TB for sidelink transmission mode 3, the set of subframes and the set of resource blocks are determined using the subframe pool indicated by the PSSCH resource configuration (described in Subclause 14.1.5) and using "Retransmission index and Time gap between initial transmission and retransmission" field and "Frequency resource location of the initial transmission and retransmission" field in the SCI format 1 as described in Subclause 14.1.1.4A.

for sidelink transmission mode 4, the set of subframes and the set of resource blocks are determined using the subframe pool indicated by the PSSCH resource configuration (described in Subclause 14.1.5) and using "Retransmission index and Time gap between initial transmission and retransmission" field and "Frequency resource location of the initial transmission and retransmission" field in the SCI format 1 as described in Subclause 14.1.1.4B.

[ . . . ]

14.1.1.6 UE Procedure for Determining the Subset of Resources to be Reported to Higher Layers in PSSCH Resource Selection in Sidelink Transmission Mode 4 and in Sensing Measurement in Sidelink Transmission Mode 3

In sidelink transmission mode 4, when requested by higher layers in subframe n for a carrier, the UE shall determine the set of resources to be reported to higher layers for PSSCH transmission according to the steps described in this Subclause. Parameters $L_{subCH}$ the number of sub-channels to be used for the PSSCH transmission in a subframe, $P_{rsvp\_TX}$ the resource reservation interval, and $prio_{TX}$ the priority to be transmitted in the associated SCI format 1 by the UE are all provided by higher layers (described in [8]). $C_{resel}$ is determined according to Subclause 14.1.1.4B.

In sidelink transmission mode 3, when requested by higher layers in subframe n for a carrier, the UE shall determine the set of resources to be reported to higher layers in sensing measurement according to the steps described in this Subclause. Parameters $L_{subCH}$, $P_{rsvp\_TX}$ and $prio_{TX}$ are all provided by higher layers (described in [11]). $C_{resel}$ is determined by $C_{resel}$=10*SL_RESOURCE_RESELECTION_COUNTER, where SL_RESOURCE_RESELECTION_COUNTER is provided by higher layers [11].

If partial sensing is not configured by higher layers then the following steps are used:

1) A candidate single-subframe resource for PSSCH transmission $R_{x,y}$ is defined as a set of $L_{subCH}$ contiguous sub-channels with sub-channel x+j in subframe $t_y^{SL}$ where j=0, . . . , $L_{subCH}$−1. The UE shall assume that any set of $L_{subCH}$ contiguous sub-channels included in the corresponding PSSCH resource pool (described in 14.1.5) within the time interval [n+$T_1$,n+$T_2$] corresponds to one candidate single-subframe resource, where selections of $T_1$ and $T_2$ are up to UE implementations under $T_1$≤4 and $T_{2min}(prio_{TX})$≤$T_2$≤100, if $T_{2min}(prio_{TX})$ is provided by higher layers for $prio_{TX}$, otherwise 20≤$T_2$≤100. UE selection of $T_2$ shall fulfil the latency requirement. The total number of the candidate single-subframe resources is denoted by $M_{total}$.

2) The UE shall monitor subframes $t_{n'-10\times P_{step}}^{SL}$, $t_{n'-10\times P_{step}+1}^{SL}$, . . . , $t_{n'-1}^{SL}$ SL except for those in which its transmissions occur, where $t_{n'}^{SL}$=n if subframe n belongs to the set ($t_0^{SL}$, $t_1^{SL}$, . . . , $t_{T_{max}}^{SL}$), otherwise subframe $t_{n'}^{SL}$ is the first subframe after subframe n belonging to the set ($t_0^{SL}$, $t_1^{SL}$, . . . , $t_{T_{max}}^{SL}$). The UE shall perform the behaviour in the following steps based on PSCCH decoded and S-RSSI measured in these subframes.

3) The parameter $Th_{a,b}$ is set to the value indicated by the i-th SL-ThresPSSCH-RSRP field in SL-ThresPSSCH-RSRP-List where i=a*8+b+1.

4) The set $S_A$ is initialized to the union of all the candidate single-subframe resources. The set $S_B$ is initialized to an empty set.

5) The UE shall exclude any candidate single-subframe resource $R_{x,y}$ from the set $S_A$ if it meets all the following conditions:

the UE has not monitored subframe $t_z^{SL}$ in Step 2.

there is an integer j which meets y+j×$P'_{rsvp\_TX}$=z+$P_{step}$×k×q where j=0, 1, . . . , $C_{resel}$−1, $P'_{rsvp\_TX}$=$P_{step}$×$P_{rsvp\_TX}$/100, k is any value allowed by the higher layer parameter restrictResourceReservationPeriod and q=1, 2, . . . , Q. Here, $$Q = \frac{1}{k} \text{ if } k < 1$$

and $n'-z \leq P_{step} \times k$, where $t_n^{SL}=n$ if subframe n belongs to the set $t_0^{SL}, t_1^{SL}, \ldots, t_{T_{max}}^{SL}$, otherwise subframe $t_n^{SL}$ is the first subframe belonging to the set $t_0^{SL}, t_1^{SL}, \ldots, t_{T_{max}}^{SL}$ after subframe n; and Q=1 otherwise.

6) The UE shall exclude any candidate single-subframe resource $R_{x,y}$ from the set $S_A$ if it meets all the following conditions:

the UE receives an SCI format 1 in subframe $t_m^{SL}$, and "Resource reservation" field and "Priority" field in the received SCI format 1 indicate the values $P_{rsvp\_RX}$ and $prio_{RX}$, respectively according to Sub-clause 14.2.1.

PSSCH-RSRP measurement according to the received SCI format 1 is higher than $Th_{prio_{TX},prio_{RX}}$.

the SCI format received in subframe $t_m^{SL}$ or the same SCI format 1 which is assumed to be received in subframe(s) $t_{m+q \times P_{step} \times P_{step\_RX}}^{SL}$ determines according to 14.1.1.4C the set of resource blocks and subframes which overlaps with $R_{x,y+j \times P'_{step\_TX}}$ for q=1, 2, ..., Q and j=0, 1, ..., $C_{resel}-1$. Here, $$Q = \frac{1}{P_{rsvp\_RX}}$$

if $P_{rsvp\_RX} < 1$ and $n'-m \leq P_{step} \times P_{rsvp\_RX}$, where $t_n^{SL}=n$ if subframe n belongs to the set $(t_0^{SL}, t_1^{SL}, \ldots, t_{T_{max}}^{SL})$, otherwise subframe $t_n^{SL}$ is the first subframe after subframe n belonging to the set $(t_0^{SL}, t_1^{SL}, \ldots, t_{T_{max}}^{SL})$; otherwise Q=1.

7) If the number of candidate single-subframe resources remaining in the set $S_A$ is smaller than $0.2 \cdot M_{total}$, then Step 4 is repeated with $Th_{a,b}$ increased by 3 dB.

8) For a candidate single-subframe resource $R_{x,y}$ remaining in the set $S_A$, the metric $E_{x,y}$ is defined as the linear average of S-RSSI measured in sub-channels x+k for k=0, ..., $L_{subCH}-1$ in the monitored subframes in Step 2 that can be expressed by $t_{y-P_{step}*j}^{SL}$ for a non-negative integer j if $P_{rsvp\_TX} \geq 100$, and $t_{y-P'_{step\_TX}*j}^{SL}$ for a non-negative integer j otherwise.

9) The UE moves the candidate single-subframe resource $R_{x,y}$ with the smallest metric $E_{x,y}$ from the set $S_A$ to $S_B$. This step is repeated until the number of candidate single-subframe resources in the set $S_B$ becomes greater than or equal to $0.2 \cdot M_{total}$.

10) When the UE is configured by upper layers to transmit using resource pools on multiple carriers, it shall exclude a candidate single-subframe resource $R_{x,y}$ from $S_B$ if the UE does not support transmission in the candidate single-subframe resource in the carrier under the assumption that transmissions take place in other carrier(s) using the already selected resources due to its limitation in the number of simultaneous transmission carriers, its limitation in the supported carrier combinations, or interruption for RF retuning time [10].

The UE shall report set $S_B$ to higher layers.
[ . . . ]

14.2 Physical Sidelink Control Channel Related Procedures

For sidelink transmission mode 3, if a UE is configured by higher layers to receive DCI format 5A with the CRC scrambled by the SL-V-RNTI or SL-SPS-V-RNTI, the UE shall decode the PDCCH/EPDCCH according to the combination defined in Table 14.2-2. A UE is not expected to receive DCI format 5A with size larger than DCI format 0 in the same search space that DCI format 0 is defined on.

[Table 14.2-2 of 3GPP TS 36.213 V15.4.0, entitled "PDCCH/EPDCCH configured by SL-V-RNTI or SL-SPS-V-RNTI", is reproduced as FIG. 5]

The carrier indicator field value in DCI format 5A corresponds to v2x-InterFreqInfo.

14.2.1 UE Procedure for Transmitting the PSCCH
[ . . . ]

For sidelink transmission mode 3,
The UE shall determine the subframes and resource blocks for transmitting SCI format 1 as follows:
SCI format 1 is transmitted in two physical resource blocks per slot in each subframe where the corresponding PSSCH is transmitted.

If the UE receives in subframe n DCI format 5A with the CRC scrambled by the SL-V-RNTI, one transmission of PSCCH is in the PSCCH resource $L_{Init}$ (described in Subclause 14.2.4) in the first subframe that is included in $(t_0^{SL}, t_1^{SL}, t_2^{SL}, \ldots)$ and that starts not earlier than $$T_{DL} - \frac{N_{TA}}{2} \times T_S + (4+m) \times 10^{-2}.$$

$L_{Init}$ is the value indicated by "Lowest index of the subchannel allocation to the initial transmission" associated with the configured sidelink grant (described in [8]), $(t_0^{SL}, t_1^{SL}, t_2^{SL}, \ldots)$ is determined by Subclause 14.1.5, the value m is indicated by 'SL index' field in the corresponding DCI format 5A according to Table 14.2.1-1 if this field is present and m=0 otherwise, $T_{DL}$ is the start of the downlink subframe carrying the DCI, and $N_{TA}$ and $T_S$ are described in [3].

If "Time gap between initial transmission and retransmission" in the configured sidelink grant (described in [8]) is not equal to zero, another transmission of PSCCH is in the PSCCH resource $L_{ReTX}$ in subframe $t_{q+SF_{gap}}^{SL}$, where $SF_{gap}$ is the value indicated by "Time gap between initial transmission and retransmission" field in the configured sidelink grant, subframe $t_q^{SL}$ corresponds to the subframe n+$k_{init} \cdot L_{ReTX}$ corresponds to the value $n_{subCH}^{start}$ determined by the procedure in Subclause 14.1.1.4C with the RIV set to the value indicated by "Frequency resource location of the initial transmission and retransmission" field in the configured sidelink grant.

The UE shall set the contents of the SCI format 1 as follows:
the UE shall set the Modulation and coding scheme as indicated by higher layers.
the UE shall set the "Priority" field according to the highest priority among those priority(s) indicated by higher layers corresponding to the transport block.
the UE shall set the Time gap between initial transmission and retransmission field, the Frequency resource location of the initial transmission and retransmission field, and the Retransmission index field such that the set of time and frequency resources determined for PSSCH according to Subclause 14.1.1.4C is in accordance with the PSSCH resource allocation indicated by the configured sidelink grant.
the UE shall set the Resource reservation according to table 14.2.1-2 based on indicated value X, where X is equal to the Resource reservation interval provided by higher layers divided by 100.

Each transmission of SCI format 1 is transmitted in one subframe and two physical resource blocks per slot of the subframe.

The UE shall randomly select the cyclic shift $n_{cs,\lambda}$ among {0, 3, 6, 9} in each PSCCH transmission.

For sidelink transmission mode 4,

The UE shall determine the subframes and resource blocks for transmitting SCI format 1 as follows:

SCI format 1 is transmitted in two physical resource blocks per slot in each subframe where the corresponding PSSCH is transmitted.

If the configured sidelink grant from higher layer indicates the PSCCH resource in subframe $t_n^{SL}$, one transmission of PSCCH is in the indicated PSCCH resource m (described in Subclause 14.2.4) in subframe $t_n^{SL}$.

If "Time gap between initial transmission and retransmission" in the configured sidelink grant (described in [8]) is not equal to zero, another transmission of PSCCH is in the PSCCH resource $L_{ReTX}$ in subframe $t_{n+SF_{gap}}^{SL}$ where $SF_{gap}$ is the value indicated by "Time gap between initial transmission and retransmission" field in the configured sidelink grant, $L_{ReTX}$ corresponds to the value $n_{subCH}^{start}$ determined by the procedure in Subclause 14.1.1.4C with the RIV set to the value indicated by "Frequency resource location of the initial transmission and retransmission" field in the configured sidelink grant.

the UE shall set the contents of the SCI format 1 as follows:

the UE shall set the Modulation and coding scheme as indicated by higher layers.

the UE shall set the "Priority" field according to the highest priority among those priority(s) indicated by higher layers corresponding to the transport block.

the UE shall set the Time gap between initial transmission and retransmission field, the Frequency resource location of the initial transmission and retransmission field, and the Retransmission index field such that the set of time and frequency resources determined for PSSCH according to Subclause 14.1.1.4C is in accordance with the PSSCH resource allocation indicated by the configured sidelink grant.

the UE shall set the Resource reservation field according to table 14.2.1-2 based on indicated value X, where X is equal to the Resource reservation interval provided by higher layers divided by 100.

Each transmission of SCI format 1 is transmitted in one subframe and two physical resource blocks per slot of the subframe.

The UE shall randomly select the cyclic shift $n_{cs,\lambda}$ among {0, 3, 6, 9} in each PSCCH transmission.

[Table 14.2.1-1 of 3GPP TS 36.213 V15.4.0, entitled "Mapping of DCI format 5A offset field to indicated value m", is reproduced as FIG. 6]

[Table 14.2.1-2 of 3GPP TS 36.213 V15.4.0, entitled "Determination of the Resource reservation field in SCI format 1", is reproduced as FIG. 7]

14.2.2 UE Procedure for Receiving the PSCCH

For each PSCCH resource configuration associated with sidelink transmission mode 3, a UE configured by higher layers to detect SCI format 1 on PSCCH shall attempt to decode the PSCCH according to the PSCCH resource configuration. The UE is not required to decode more than one PSCCH at each PSCCH resource candidate. The UE shall not assume any value for the "Reserved bits" before decoding a SCI format 1.

For each PSCCH resource configuration associated with sidelink transmission mode 4, a UE configured by higher layers to detect SCI format 1 on PSCCH shall attempt to decode the PSCCH according to the PSCCH resource configuration. The UE is not required to decode more than one PSCCH at each PSCCH resource candidate. The UE shall not assume any value for the "Reserved bits" before decoding a SCI format 1.

3GPP TS 36.214 specifies some measurements for sidelink transmission in LTE/LTE-A as follows:

5.1.29 PSSCH Reference Signal Received Power (PSSCH-RSRP)

| | |
|---|---|
| Definition | PSSCH Reference Signal Received Power (PSSCH-RSRP) is defined as the linear average over the power contributions (in [W]) of the resource elements that carry demodulation reference signals associated with PSSCH, within the PRBs indicated by the associated PSCCH. The reference point for the PSSCH-RSRP shall be the antenna connector of the UE. If receiver diversity is in use by the UE, the reported value shall not be lower than the corresponding PSSCH-RSRP of any of the individual diversity branches |
| Applicable for | RRC_IDLE intra-frequency, RRC_IDLE inter-frequency, RRC_CONNECTED intra-frequency, RRC_CONNECTED inter-frequency |

5.1.30 Channel Busy Ratio (CBR)

| | |
|---|---|
| Definition | Channel busy ratio (CBR) measured in subframe n is defined as follows: For PSSCH, the portion of sub-channels in the resource pool whose S-RSSI measured by the UE exceed a (pre-)con-figured threshold sensed over subframes [n − 100, n − 1]; For PSCCH, in a pool (pre)configured such that PSCCH may be transmitted with its corresponding PSSCH in non-adjacent resource blocks, the portion of the resources of the PSCCH pool whose S-RSSI measured by the UE exceed a (pre-)configured threshold sensed over subframes [n − 100, n − 1], assuming that the PSCCH pool is composed of resources with a size of two consecutive PRB pairs in the frequency domain. |
| Applicable for | RRC_IDLE intra-frequency, RRC_IDLE inter-frequency, RRC_CONNECTED intra-frequency, RRC_CONNECTED inter-frequency |

5.1.31 Channel Occupancy Ratio (CR)

| | |
|---|---|
| Definition | Channel occupancy ratio (CR) evaluated at subframe n is defined as the total number of sub-channels used for its transmissions in subframes [n − a, n − 1] and granted in subframes [n, n + b] divided by the total number of configured sub-channels in the transmission pool over [n − a, n + b]. |
| Applicable for | RRC_IDLE intra-frequency, RRC_IDLE inter-frequency, RRC_CONNECTED intra-frequency, RRC_CONNECTED inter-frequency |

3GPP TS 36.212 specifies CRC attachment for downlink shared channel and downlink control information in LTE/LTE-A. The downlink shared channel and downlink control information are for communication between network node and UE, i.e. Uu link. The sidelink shared channel and sidelink control information are for communication between UEs, i.e. PC5 link or sidelink.

5.3.3.1.9A Format 5A

DCI format 5A is used for the scheduling of PSCCH, and also contains several SCI format 1 fields used for the scheduling of PSSCH.

The following information is transmitted by means of the DCI format 5A:

Carrier indicator—3 bits. This field is present according to the definitions in [3].

Lowest index of the subchannel allocation to the initial transmission—$\lceil \log_2(N_{subchannel}^{SL}) \rceil$ bits as defined in subclause 14.1.1.4C of [3].

SCI format 1 fields according to 5.4.3.1.2:
Frequency resource location of initial transmission and retransmission.
Time gap between initial transmission and retransmission.
SL index—2 bits as defined in subclause 14.2.1 of [3] (this field is present only for cases with TDD operation with uplink-downlink configuration 0-6).

When the format 5A CRC is scrambled with SL-SPS-V-RNTI, the following fields are present:
SL SPS configuration index—3 bits as defined in subclause 14.2.1 of [3].
Activation/release indication—1 bit as defined in subclause 14.2.1 of [3].

[ . . . ]

5.4.3.1 SCI Formats 5.4.3.1.2 SCI Format 1

SCI format 1 is used for the scheduling of PSSCH.

The following information is transmitted by means of the SCI format 1:

Priority—3 bits as defined in subclause 4.4.5.1 of [7].

Resource reservation—4 bits as defined in subclause 14.2.1 of [3].

Frequency resource location of initial transmission and retransmission—$\lceil \log_2(N_{subchannel}^{SL}(N_{subchannel}^{SL}+1)/2) \rceil$ bits as defined in subclause 14.1.1.4C of [3].

Time gap between initial transmission and retransmission—4 bits as defined in subclause 14.1.1.4C of [3].

Modulation and coding scheme—5 bits as defined in subclause 14.2.1 of [3].

Retransmission index—1 bit as defined in subclause 14.2.1 of [3].

Transmission format—1 bit, where value 1 indicates a transmission format including rate-matching and TBS scaling, and value 0 indicates a transmission format including puncturing and no TBS-scaling. This field is only present if the transport mechanism selected by higher layers indicates the support of rate matching and TBS scaling.

Reserved information bits are added until the size of SCI format 1 is equal to 32 bits. The reserved bits are set to zero.

3GPP TS 36.211 specifies generation for physical sidelink shared channel and physical sidelink control channel in LTE/LTE-A. The physical sidelink shared channel and physical sidelink control channel are for communication between devices, i.e. PC5 link or device-to-device link. The physical sidelink shared channel (PSSCH) delivers data or transport block for sidelink shared channel (SL-SCH). The physical sidelink control channel (PSCCH) delivers sidelink control information (SCI).

9 Sidelink 9.1.1 Physical Channels

A sidelink physical channel corresponds to a set of resource elements carrying information originating from higher layers and is the interface defined between 3GPP TS 36.212 [3] and the present document 3GPP TS 36.211. The following sidelink physical channels are defined:

Physical Sidelink Shared Channel, PSSCH
Physical Sidelink Control Channel, PSCCH 3GPP RP-182111 specifies the Justification and objective of study item on NR V2X as follows:

3 Justification

SA1 has identified 25 use cases for advanced V2X services and they are categorized into four use case groups: vehicles platooning, extended sensors, advanced driving and remote driving. The detailed description of each use case group is provided as below.

Vehicles Platooning enables the vehicles to dynamically form a platoon travelling together. All the vehicles in the platoon obtain information from the leading vehicle to manage this platoon. These information allow the vehicles to drive closer than normal in a coordinated manner, going to the same direction and travelling together.

Extended Sensors enables the exchange of raw or processed data gathered through local sensors or live video images among vehicles, road site units, devices of pedestrian and V2X application servers. The vehicles can increase the perception of their environment beyond of what their own sensors can detect and have a more broad and holistic view of the local situation. High data rate is one of the key characteristics.

Advanced Driving enables semi-automated or full-automated driving. Each vehicle and/or RSU shares its own perception data obtained from its local sensors with vehicles in proximity and that allows vehicles to synchronize and coordinate their trajectories or manoeuvres. Each vehicle shares its driving intention with vehicles in proximity too.

Remote Driving enables a remote driver or a V2X application to operate a remote vehicle for those passengers who cannot drive by themselves or remote vehicles located in dangerous environments. For a case where variation is limited and routes are predictable, such as public transportation, driving based on cloud computing can be used. High reliability and low latency are the main requirements.

In RAN1 #94 meeting (as discussed in 3GPP RP-1810051), RAN1 has the following agreements about NR V2X:

Agreements:
RAN1 to study the following topics for the SL enhancement for unicast and/or groupcast. Other topics are not precluded.
HARQ feedback
CSI acquisition
Open loop and/or closed-loop power control
Link adaptation
Multi-antenna transmission scheme Agreements:
At least PSCCH and PSSCH are defined for NR V2X. PSCCH at least carries information necessary to decode PSSCH.

[ . . . ]

Agreements:
RAN1 to continue study on multiplexing physical channels considering at least the above aspects:

Multiplexing of PSCCH and the associated PSSCH (here, the "associated" means that the PSCCH at least carries information necessary to decode the PSSCH).
Study further the following options:
 Option 1: PSCCH and the associated PSSCH are transmitted using non-overlapping time resources.
  Option 1A: The frequency resources used by the two channels are the same.
  Option 1B: The frequency resources used by the two channels can be different.
 Option 2: PSCCH and the associated PSSCH are transmitted using non-overlapping frequency resources in the all the time resources used for transmission. The time resources used by the two channels are the same.
 Option 3: A part of PSCCH and the associated PSSCH are transmitted using overlapping time resources in non-overlapping frequency resources, but another part of the associated PSSCH and/or another part of the PSCCH are transmitted using non-overlapping time resources.

[ . . . ]

Agreements:
 At least two sidelink resource allocation modes are defined for NR-V2X sidelink communication
  Mode 1: Base station schedules sidelink resource(s) to be used by UE for sidelink transmission(s)
  Mode 2: UE determines (i.e. base station does not schedule) sidelink transmission resource(s) within sidelink resources configured by base station/network or preconfigured sidelink resources In the RAN1 #94bis meeting (as discussed in 3GPP RP-1812101), RAN1 has the following agreements about NR V2X:

Agreements:
 Layer-1 destination ID is conveyed via PSCCH.
 Additional Layer-1 ID(s) is conveyed via PSCCH at least for the purpose of identifying which transmissions can be combined in reception when HARQ feedback is in use.

Agreements:
 For unicast, sidelink HARQ feedback and HARQ combining in the physical layer are supported.
 For groupcast, sidelink HARQ feedback and HARQ combining in the physical layer are supported.

Agreements:
For PSCCH and associated PSSCH multiplexing
 At least one of Option 1A, 1B, and 3 is supported.

Agreements:
 Sidelink control information (SCI) is defined.
 SCI is transmitted in PSCCH.
 SCI includes at least one SCI format which includes the information necessary to decode the corresponding PSSCH.
 NDI, if defined, is a part of SCI.
 Sidelink feedback control information (SFCI) is defined.
 SFCI includes at least one SFCI format which includes HARQ-ACK for the corresponding PSSCH.

Agreements:
 At least resource pool is supported for NR sidelink
 Resource pool is a set of time and frequency resources that can be used for sidelink transmission and/or reception.
 A resource pool is inside the RF bandwidth of the UE.
 UE assumes a single numerology in using a resource pool.
 Multiple resource pools can be configured to a single UE in a given carrier.

It is RAN1 understanding that, in some cases, the entire system bandwidth is covered by a single BWP.
There is at most one activated sidelink BWP for a UE in a given carrier as in the Uu case In the RAN1 #95 meeting (as discussed in 3GPP RP-1901482), RAN1 has the following agreements about NR V2X:

Working Assumption:
 Regarding PSCCH/PSSCH multiplexing, at least option 3 is supported for CP-OFDM.

Agreements:
 Physical sidelink feedback channel (PSFCH) is defined and it is supported to convey SFCI for unicast and groupcast via PSFCH.

Agreements:
 When SL HARQ feedback is enabled for unicast, the following operation is supported for the non-CBG case:
  Receiver UE generates HARQ-ACK if it successfully decodes the corresponding TB. It generates HARQ-NACK if it does not successfully decode the corresponding TB after decoding the associated PSCCH which targets the receiver UE.

Agreements:
 It is supported to enable and disable SL HARQ feedback in unicast and groupcast.

In the RAN1 #AH_1901 meeting (as discussed in 3GPP RP-1901483), RAN1 has the following agreements about NR V2X:

Agreements:
 For time domain resources of a resource pool for PSSCH, Support the case where the resource pool consists of non-contiguous time resources Agreements:
 Layer-1 destination ID can be explicitly included in SCI
 The following additional information can be included in SCI
  Layer-1 source ID
   FFS how to determine Layer-1 source ID
   FFS size of Layer-1 source ID
  HARQ process ID
  NDI
  RV Agreements:
 For determining the resource of PSFCH containing HARQ feedback, support that the time gap between PSSCH and the associated PSFCH is not signaled via PSCCH at least for modes 2(a)(c)(d) (if respectively supported)

Agreements:
 It is supported that in mode 1 for unicast, the in-coverage UE sends an indication to gNB to indicate the need for retransmission
  At least PUCCH is used to report the information
   If feasible, RAN1 reuses PUCCH defined in Rel-15
  The gNB can also schedule re-transmission resource Agreements:
 (Pre-)configuration indicates whether SL HARQ feedback is enabled or disabled in unicast and/or groupcast.
  When (pre-)configuration enables SL HARQ feedback, FFS whether SL HARQ feedback is always used or there is additional condition of actually using SL HARQ feedback Agreements:
Mode-2 supports the sensing and resource (re)-selection procedures according to the previously agreed definitions.

Agreements:
SCI decoding applied during sensing procedure provides at least information on sidelink resources indicated by the UE transmitting the SCI In the RAN1 #96 meeting (as discussed in 3GPP RP-1905837), RAN1 has the following agreements about NR V2X:

Agreements:
For the operation regarding PSSCH, a UE performs either transmission or reception in a slot on a carrier.
NR sidelink supports for a UE:
A case where all the symbols in a slot are available for sidelink.
Another case where only a subset of consecutive symbols in a slot is available for sidelink
Note: this case is not intended to be used for the ITS spectra, if there is no forward-compatibility issue. Finalize in the WI phase whether there is such an issue or not
The subset is NOT dynamically indicated to the UE Agreements:
At least for sidelink HARQ feedback, NR sidelink supports at least a PSFCH format which uses last symbol(s) available for sidelink in a slot.

Agreements:
(Pre-)configuration indicates the time gap between PSFCH and the associated PSSCH for Mode 1 and Mode 2.

Agreements:
Blind retransmissions of a TB are supported for SL by NR-V2X

Agreements:
NR V2X Mode-2 supports reservation of sidelink resources at least for blind retransmission of a TB Agreements:
Mode-2 sensing procedure utilizes the following sidelink measurement
L1 SL-RSRP based on sidelink DMRS when the corresponding SCI is decoded Agreements:
CSI reporting can be enabled and disabled by configuration.

In the RAN1 #96bis meeting (as discussed in 3GPP RP-1905921), RAN1 has the following agreements about NR V2X:

Agreements:
At least for transmission perspective of a UE in a carrier, at least TDM between PSCCH/PSSCH and PSFCH is allowed for a PSFCH format for sidelink in a slot.

Agreements:
NR V2X supports an initial transmission of a TB without reservation, based on sensing and resource selection procedure
NR V2X supports reservation of a sidelink resource for an initial transmission of a TB at least by an SCI associated with a different TB, based on sensing and resource selection procedure
This functionality can be enabled/disabled by (pre-)configuration Agreements:
It is supported, in a resource pool, that within the slots associated with the resource pool, PSFCH resources can be (pre)configured periodically with a period of N slot(s)
N is configurable, with the following values
1
At least one more value>1
The configuration should also include the possibility of no resource for PSFCH. In this case, HARQ feedback for all transmissions in the resource pool is disabled
HARQ feedback for transmissions in a resource pool can only be sent on PSFCH in the same resource pool Agreements:
Support at least Sidelink CSI-RS for CQI/RI measurement
Sidelink CSI-RS is confined within the PSSCH transmission In the RAN1 #97 meeting (as discussed in the Draft Report of 3GPP TSG RAN WG1 #97 V0.1.0), RAN1 has the following agreements about NR V2X:

Conclusion:
If two-stage SCI is supported, the following details are used.
Information related to channel sensing is carried on 1st-stage.
2nd-stage is decoded by using PSSCH DMRS.
Polar coding used for PDCCH is applied to 2nd-stage
Payload size for 1st-stage in two-stage SCI case is the same for unicast, groupcast, and broadcast in a resource pool.
After decoding the 1st-stage, the receiver does not need to perform blind decoding of 2nd-stage.

Agreements:
Transmission of PSSCH is mapped onto contiguous PRBs only

Agreements:
Sub-channel size is (pre)configurable.

Agreements:
Sidelink HARQ ACK/NACK report from transmitter UE to gNB is supported with details FFS.

Conclusion:
RAN1 to discuss further the following
Maximum number of blind retransmissions supported for one TB
Maximum number of reserved blind retransmission
Maximum number of HARQ feedback-based retransmissions supported for one TB
Maximum number of reserved HARQ feedback-based retransmission Agreements:
RAN1 to further select between the following options of sidelink resource reservation for blind retransmissions:
Option 1: A transmission can reserve resources for none, one, or more than one blind retransmission
Option 2: A transmission can reserve resource for none or one blind retransmission Agreements:
Resource selection window is defined as a time interval where a UE selects sidelink resources for transmission
The resource selection window starts T1≥0 after a resource (re-)selection trigger and is bounded by at least a remaining packet delay budget Agreements:
Support a sub-channel as the minimum granularity in frequency domain for the sensing for PSSCH resource selection Agreements:
For the period of N slot(s) of PSFCH resource, N=2 and N=4 are additionally supported.

Agreements:
For a PSSCH transmission with its last symbol in slot n, when the corresponding HARQ feedback is due for transmission, it is expected to be in slot n+a where a is the smallest integer larger than or equal to K with the condition that slot n+a contains PSFCH resources.

Agreements:
At least for the case when the PSFCH in a slot is in response to a single PSSCH:
Implicit mechanism is used to determine at least frequency and/or code domain resource of PSFCH, within a configured resource pool. At least the following parameters are used in the implicit mechanism:
Slot index (FFS details) associated with PSCCH/PSSCH/PSFCH
Sub-channel(s) (FFS details) associated with PSCCH/PSSCH
Identifier (FFS details) to distinguish each RX UE in a group for Option 2 groupcast HARQ feedback In the RAN1 #98 meeting (as discussed in the Draft Report of 3GPP TSG RAN WG1 #98 V0.1.0), RAN1 has the following agreements about NR V2X:

Agreements:
In physical layer perspective, a (pre-)configured resource pool can be used for all of unicast, groupcast, and broadcast for a given UE.
There is no (pre-)configuration to inform which cast types are used for the resource pool.

Agreements:
Support 2-stage SCI
$1^{st}$ SCI is carried in PSCCH.

Agreements:
At least for mode 2, The maximum number of SL resources $N_{MAX}$ reserved by one transmission including current transmission is [2 or 3 or 4]
Aim to select the particular number in RAN1 #98
$N_{MAX}$ is the same regardless of whether HARQ feedback is enabled or disabled Agreements:
At least for mode 2, (Pre-)configuration can limit the maximum number of HARQ (re-)transmissions of a TB Up to 32
If no (pre)configuration, the maximum number is not specified Agreements:
In Mode-2, SCI payload indicates sub-channel(s) and slot(s) used by a UE and/or reserved by a UE for PSSCH (re-)transmission(s)
SL minimum resource allocation unit is a slot Working Assumption:
An indication of a priority of a sidelink transmission is carried by SCI payload
This indication is used for sensing and resource (re) selection procedures
This priority is not necessarily the higher layer priority Agreements:
The resource (re-)selection procedure includes the following steps
Step 1: Identification of candidate resources within the resource selection window
Step 2: Resource selection for (re-)transmission(s) from the identified candidate resources Agreements:
In Step 1 of the resource (re-)selection procedure, a resource is not considered as a candidate resource if:
The resource is indicated in a received SCI and the associated L1 SL-RSRP measurement is above an SL-RSRP threshold
The SL-RSRP threshold is at least a function of the priority of the SL transmission indicated in the received SCI and the priority of the transmission for which resources are being selected by the UE Agreements:
For PSSCH-to-HARQ feedback timing, to down-select:
Option 1: K is the number of logical slots (i.e., the slots within the resource pool)
Option 2: K is the number of physical slots (i.e., the slots within and outside the resource pool)

3GPP R1-1908917 provides the following discussion about sidelink CSI-RS related procedures and CSI report:
4 Sidelink CSI Report and Sidelink CSI-RS
In this section, we further discuss the details of CSI acquisition for sidelink unicast, including CSI report and the corresponding sidelink CSI-RS (SCSI-RS). The focus in this paper is on CSI report over SL.
4.1 Sidelink CSI Report Procedures
As agreed during SI, non-subband-based RI and CQI reports will be supported for sidelink unicast. In NR Uu transmissions, typically one RI value and the associated PMI and/or CQI are reported, where RI represents the maximum possible transmission rank of the measured channel. However, this may not be suitable for V2X applications which have diverse service requirements in terms of data rate and reliability. More specifically, some NR V2X use cases may target high data rate while others target high reliability. On the other hand, single unicast connection established between the transmitter UE and the receiver UE may carry different V2X services (using different SLRB). In addition, different unicast connections can be established (as per SA2 outcome), however the link condition between the UEs is the same. Accordingly, to satisfy the diverse requirements, some services are interested in multi-layer transmissions while other services are interested in single-layer transmissions. However, when the receiver reports CSI parameters, it is typically not aware of the transmitter's interest, e.g., the transmission requirement. In this case, it is beneficial to report multiple CQI values associated with different RI values respectively, which gives the transmitter the flexibility to select more proper transmission parameters based on its own needs.

One sidelink CSI report may include multiple CQIs associated with different RIs respectively.

Since it has been agreed to support up to two antenna ports, the rank of a PSSCH transmission can only be either 1 or 2. Hence, 1 bit is enough for RI. Moreover, for one CQI report, within a given CQI table, 4 bits are enough as in NR Uu. In this way, SL CSI report size is 5 bits when reporting one RI and its associated CQI. SL CSI report size is 9 bits when report two CQIs associated with rank-1 and rank-2 respectively.

SL CSI report size is up to 9 bits for NR Rel-16.
Furthermore, it has been clarified in WID [1] that for sidelink unicast, CSI is delivered using PSSCH (including PSSCH containing CSI only) using the resource allocation procedure for data transmission. Note that for a single UE, it is possible to have two scenarios:
1) CSI-report only transmission;
2) Simultaneous CSI report and data transmissions.

In general, there are two ways to carry CSI report over SL.
Option 1: Carried as a separate MAC CE or an RRC message,
Option 2: Piggybacked in PSSCH as the way of carrying UCI over PUSCH.

We see some drawbacks of option 2. First, a proper piggyback design requires a large amount of simulations to evaluate various RE mappings and β offset values, which is quite challenging given the remaining WI time. Second, and more importantly, piggyback solution is not good for forward compatibility, since in a later release we may have more CSI report parameters and thus a larger CSI report size. In that case, the current RE mappings and β offset values may not be valid anymore. Third, piggybacking in PSSCH implies that coding similar to UL polar code is used for CSI reporting which is not favourable as every UE will have to implement the corresponding codec. Therefore, we believe that only option 1 should be supported.

SL CSI report piggyback on PSSCH is not supported.

When it comes to MAC CE and RRC, we think that MAC CE is more flexible compared to RRC. First, consider the scenario where a UE has both data and CSI report targeting the same receiver UE. If MAC CE is used to carry CSI report, data and CSI report can be formed as either one TB (i.e., one PSSCH) or two separate TBs (i.e., two PSSCHs). On the other hand, if RRC is used to carry CSI report, data and CSI report can only be formed as two separate TBs (i.e., two PSSCHs). Furthermore, if CSI report is carried via MAC CE with its specifically configured LCID, no additional signalling in SCI is needed to indicate the presence of SL CSI report in the TB transmission. In addition, when a UE has only CSI report to transmit or a UE's data and CSI report targets different UEs, the UE can form two separate TBs, irrespective of CSI report carried by MAC CE or RRC. For carrying CSI report over sidelink, MAC CE is more flexible compared to RRC.

Whether MAC CE or RRC is eventually used to carry CSI report, we think that it is in RAN2 domain and RAN1 leaves it up to RAN2 to decide. Furthermore, prioritization between CSI report and data transmissions should also be done and is also specified by RAN2.

It is up to RAN2 to decide if MAC CE or RRC message is used to carry CSI reports and the respective details specific to the solution.

For aperiodic CSI-report triggering, the TX UE can trigger sidelink report when it is needed, e.g., to perform link adaptation, adaptation of transmission layers, etc. For this purpose, the TX UE can include an indication in SCI to trigger the CSI report from the RX UE.

An indication in SCI is used to trigger sidelink CSI report from the RX UE.

4.2 Sidelink CSI-RS Procedures

It has been agreed in RAN1 #96bis to support sidelink CSI-RS for CQI/RI measurement, where CSI-RS is confined with the PSSCH transmission.

The SL CSI-RS should be designed in such a way that it facilitates CSIT acquisition either in a reciprocity-based manner and/or in a feedback-based manner. Specifically, when channel reciprocity can be exploited, CSIT can be obtained using SL CSI-RS transmitted by the peer UE. On the other hand, when channel reciprocity does not hold, SL CSI-RS can be used to measure the channel and/or the interference which are then reported back to the transmitter to facilitate CSIT acquisition, which is considered as SL CSI report. Since SCSI-RS may or may not be present in a slot, we can use the SCI transmitted over PSSCH to indicate its presence.

The presence of SL CSI-RS in a slot is indicated by an SCI carried by the PSCCH.

The Draft Report of 3GPP TSG RAN WG1 #98bis V0.1.0 states:

Agreements:
  A slot is the time-domain granularity for resource pool configuration.
  To down-select:
    Alt 1. Slots for a resource pool is (pre-)configured with bitmap, which is applied with periodicity
    Alt 2. Slots for a resource pool is (pre-)configured, where the slots are applied with periodicity.
Agreements:
  Support (pre-)configuration of a resource pool consisting of contiguous PRBs only
Agreements:
  For the number of bits of L1 IDs,
    Layer-1 destination ID: 16 bits
    Layer-1 source ID: 8 bits
Agreements:
  PSCCH for $1^{st}$ stage SCI with 2 and 3 symbols is supported in Rel-16.
    The number of symbols above excludes AGC symbols if any
    The number of PSCCH symbols is explicitly (pre-)configured per Tx/Rx resource pool
Agreements:
  Resource mapping of SL CSI-RS is performed by using one SL CSI-RS pattern in an RB, where the possible patterns in an RB are a subset of NR Uu CSI-RS time-frequency/CDM resource mapping patterns in an RB
    The subset is to be pre-defined by spec
Agreements:
  SL CSI-RS is transmitted by a UE only if:
    when the corresponding PSSCH is transmitted (as agreed before) by the UE, and,
    when SL CQI/RI reporting is enabled by higher layer signaling, and
    when enabled, if the corresponding SCI by the UE triggers the SL CQI/RI reporting
Agreements:
  The $2^{nd}$ stage SCI is carried within the resource of the corresponding PSSCH.
  Scrambling operation for the $2^{nd}$ stage SCI is applied separately with PSSCH
Agreements:
  Support {10, 15, 20, 25, 50, 75, 100} PRBs for possible sub-channel size.
  One value of the above set is (pre)configured for the sub-channel size for the resource pool.
  Size of PSCCH: X
    X≤N, where N is the number of PRBs of the subchannel
    X is (pre)-configurable with values FFS, X
Working Assumption:
  Each transmission in a resource provided by a configured grant contains PSCCH and PSSCH.
Agreements:
  In Step 1, initial L1 SL-RSRP threshold for each combination of $p_i$ and $p_j$ is (pre-)configured, where $p_i$-priority indication associated with the resource indicated in SCI and $p_j$-priority of the transmission in the UE selecting resources
Agreements:
  In Step 1, when the ratio of identified candidate resources to the total number of resources in a resource selection window, is less than X %, all configured thresholds are increased by Y dB and the resource identification procedure is repeated
    FFS value(s)/configurability of X
    At least one value of X=20
    Y=3

Agreements:
    For CQI/RI reporting on PSSCH:
        Higher layer signaling (e.g. MAC CE) is used for CQI/RI reporting
            Details up to RAN2
        SL CQI/RI measurement and derivation are based on the existing physical layer procedure for Uu
Agreements:
    For PSSCH-to-HARQ feedback timing, K is the number of logical slots (i.e. the slots within the resource pool)
Working Assumption:
    For HARQ feedback in groupcast and unicast, when PSFCH resource is (pre-)configured in the resource pool,
        SCI explicitly indicates whether HARQ feedback is used or not for the corresponding PSSCH transmission.
        3GPP TS 36.321 states:
5.14.1.3 Multiplexing and Assembly
For PDU(s) associated with one SCI, MAC shall consider only logical channels with the same Source Layer-2 ID-Destination Layer-2 ID pair.
Multiple transmissions within overlapping SC periods to different ProSe Destinations are allowed subject to single-cluster SC-FDM constraint.
In V2X sidelink communication, multiple transmissions for different Sidelink processes are allowed to be independently performed in different subframes.
5.14.1.3.1 Logical Channel Prioritization
The Logical Channel Prioritization procedure is applied when a new transmission is performed. Each sidelink logical channel has an associated priority which is the PPPP and optionally an associated PPPR. Multiple sidelink logical channels may have the same associated priority. The mapping between priority and LCID is left for UE implementation. If duplication is activated as specified in TS 36.323 [4], the MAC entity shall map different sidelink logical channels which correspond to the same PDCP entity onto different carriers in accordance with clause 5.14.1.5, or onto different carriers of different carrier sets (if configured in allowedCarrierFreqList for the corresponding destination). For a given sidelink logical channel, it is up to UE implementation which carrier set to select among the carrier sets configured in allowedCarrierFreqList (if configured) for the corresponding destination.
The MAC entity shall perform the following Logical Channel Prioritization procedure either for each SCI transmitted in an SC period in sidelink communication, or for each SCI corresponding to a new transmission in V2X sidelink communication:
    The MAC entity shall allocate resources to the sidelink logical channels in the following steps:
        Only consider sidelink logical channels not previously selected for this SC period and the SC periods (if any) which are overlapping with this SC period, to have data available for transmission in sidelink communication;
        Only consider sidelink logical channels which meet the following conditions:
            allowed on the carrier where the SCI is transmitted for V2X sidelink communication, if the carrier is configured by upper layers according to TS 36.331 [8] and TS 24.386 [15];
            having a priority whose associated threshCBR-FreqReselection is no lower than the CBR of the carrier when the carrier is (re-)selected in accordance with 5.14.1.5;
        Only consider one sidelink logical channel among sidelink logical channels corresponding to same PDCP entity, if duplication is activated as specified in TS 36.323 [4].
    Step 0: Select a ProSe Destination, having the sidelink logical channel with the highest priority, among the sidelink logical channels having data available for transmission and having the same transmission format as the one selected corresponding to the ProSe Destination;
        NOTE: The sidelink logical channels belonging to the same ProSe Destination have the same transmission format.
    For each MAC PDU associated to the SCI:
        Step 1: Among the sidelink logical channels belonging to the selected ProSe Destination and having data available for transmission, allocate resources to the sidelink logical channel with the highest priority;
        Step 2: if any resources remain, sidelink logical channels belonging to the selected ProSe Destination are served in decreasing order of priority until either the data for the sidelink logical channel(s) or the SL grant is exhausted, whichever comes first. Sidelink logical channels configured with equal priority should be served equally.
    The UE shall also follow the rules below during the scheduling procedures above:
        the UE should not segment an RLC SDU (or partially transmitted SDU) if the whole SDU (or partially transmitted SDU) fits into the remaining resources;
        if the UE segments an RLC SDU from the sidelink logical channel, it shall maximize the size of the segment to fill the grant as much as possible;
        the UE should maximise the transmission of data;
        if the MAC entity is given a sidelink grant size that is equal to or larger than 10 bytes (for sidelink communication) or 11 bytes (for V2X sidelink communication) while having data available for transmission, the MAC entity shall not transmit only padding.
5.14.1.3.2 Multiplexing of MAC SDUs
The MAC entity shall multiplex MAC SDUs in a MAC PDU according to clauses 5.14.1.3.1 and 6.1.6.
    One or multiple of following terminologies may be used hereafter:
    BS: A network central unit or a network node in NR which is used to control one or multiple TRPs which are associated with one or multiple cells. Communication between BS and TRP(s) is via fronthaul. BS could also be referred to as central unit (CU), eNB, gNB, or NodeB.
    TRP: A transmission and reception point provides network coverage and directly communicates with UEs. TRP could also be referred to as distributed unit (DU) or network node.
    Cell: A cell is composed of one or multiple associated TRPs, i.e. coverage of the cell is composed of coverage of all associated TRP(s). One cell is controlled by one BS. Cell could also be referred to as TRP group (TRPG).
    NR-PDCCH: A channel carries downlink control signal which is used to control communication between a UE and a network side. A network transmits NR-PDCCH on configured control resource set (CORESET) to the UE.
    Slot: A slot could be a scheduling unit in NR. A slot duration has 14 OFDM symbols.

One or multiple of following assumptions for network side may be used hereafter:

Downlink timing of TRPs in the same cell are synchronized.

RRC layer of network side is in BS.

One or multiple of following assumptions for UE side may be used hereafter:

There are at least two UE (RRC) states: connected state (or called active state) and non-connected state (or called inactive state or idle state). Inactive state may be an additional state or belong to connected state or non-connected state.

In NR sidelink V2X, a sidelink LCH (Logical Channel) data could be (pre-)configured with either enabling SL (Sidelink) HARQ-ACK (Hybrid Automatic Repeat Request-Acknowledgement) or disabling SL HARQ-ACK (e.g., a SL HARQ-ACK behavior). The (pre-)configuration for enabling or disabling SL HARQ-ACK for a sidelink (LCH) data may depend on requirement and/or priority for the sidelink (LCH) data. For example, some high reliability requirement service/data may require sidelink (LCH) data with enabling SL HARQ-ACK to satisfying its requirement while latency-sensitive service may be disabling SL HARQ-ACK due to unnecessary latency caused by HARQ feedback-based retransmission(s). In addition, in case the (pre-)configuration enabling SL HARQ-ACK for a sidelink (LCH) data, SCI (Sidelink Control Information) could dynamically indicate whether a receiver/RX device need to transmit SL HARQ-ACK or not.

Considering congested situation, it would be beneficial to dynamically indicate no SL HARQ-ACK for avoiding additional retransmission(s). For example, assuming enabling SL HARQ-ACK for a LCH, when a transmitter/TX device transmits a SCI scheduling data associated to the LCH, the SCI would comprise a field indicating whether a RX device transmits SL HARQ-ACK or not.

According to the RAN1 #98b meeting, SL CSI (Channel State Information)-report or SL RSRP (Reference Signal Received Power) report (from a device to a device) is agreed to be transmitted via MAC (Medium Access Control) CE (Control Element).

According to scope of working item for Release-16 NR sidelink V2X, NR sidelink V2X supports two scenarios for transmitting SL CSI-report. A first scenario is when a device does not have (LCH) data to transmit, the device could transmit the MAC CE(s) comprising SL CSI-report stand-alone (without data). It means that the device could transmit a MAC PDU comprising the MAC CE(s) only without (LCH) data. A second scenario is when a device has (LCH) data to transmit, the device could multiplex the (LCH) data and the MAC CE(s) comprising SL CSI-report to transmit. It means that the device could transmit a MAC PDU comprising the data and the MAC CE.

From a TX device point of view, how to dynamically indicate whether a RX device need to transmit SL HARQ-ACK or not may be unclear since transmission comprising different SL HARQ-ACK behavior for MAC CE(s) and for data. In addition, MAC CE would deliver SL CSI-report and/or SL RSRP report. One situation may also happen when a sidelink transmission contains MAC CE(s), and the MAC CE(s) are (pre-)configured with different enabling or disabling SL HARQ-ACK. How a TX device derives to indicate or set enable or disable SL HARQ-ACK in SCI is unclear.

In general, the issue could be illustrated in FIG. 8, (LCH) data with enabling SL HARQ-ACK and MAC CE for carrying report (e.g., SL CSI-report, and/or SL RSRP report) with disabling SL HARQ-ACK or vice versa may need to consider the behavior of TX device and RX device.

For the first scenario, the device could indicate whether to enable or disable SL HARQ-ACK for the MAC CE probably based on a (pre-)configuration for enabling or disabling for the MAC CE. The mechanism may be different from Uu since uplink control information is one shot by a guaranteed reliable code rate and does not support retransmission. Hence, alternatively, if following logic of uplink control information, for the MAC CE (comprising SL CSI-report), it seems possible to set disabling SL HARQ-ACK or does not design or enable such parameter in the (pre-)configuration.

For the second scenario, since size of the MAC CE is small (e.g., 4 bits CQI index+1 bit RI (Rank Indication) index+MAC header for a MAC CE comprising SL CSI-report), multiplexing with data could be feasible. However, if based on same logic from the first scenario (i.e., disabling SL HARQ-ACK for the MAC CE), this multiplexed sidelink transmission may comprise data which need or enable SL HARQ-ACK and MAC CE which disable or does not need SL HARQ-ACK.

Concept 1: Only Allow Multiplex with Same Enabling/Disabling Configuration of MAC CE(s), Data One general concept of the invention is that a limitation for a first device to perform a first sidelink transmission, wherein the first sidelink transmission comprises (LCH) data and/or MAC CE(s) with same enabling SL HARQ-ACK or same disabling SL HARQ-ACK from (pre-)configuration. In other words, the first device may not be allowed to multiplex data and/or MAC CE(s) with different enabling or disabling SL HARQ-ACK.

Additionally or alternatively, the first device could multiplex (SL) data and/or MAC CE(s) associated with a same SL HARQ-ACK behavior in one TB (Transport Block), e.g. MAC PDU). The first device could not multiplex (SL) data and/or MAC CE(s) associated with different SL HARQ-ACK behaviors in on TB (e.g. MAC PDU). The SL HARQ-ACK behavior could be enabling SL HARQ-ACK or disabling SL HARQ-ACK.

In one embodiment, one (pre-)configuration for (LCH) data may indicate enabling or disabling SL HARQ-ACK for (LCH) data. The first device could be (pre-)configured (by a network) with a SL HARQ-ACK behavior for each SL LCH, SL radio bearer (RB), or destination identity (destination ID). The SL HARQ behavior could be the same for all SL LCHs, SLRBs (Sidelink Radio Bearers), or destination IDs. The SL HARQ-ACK behavior could be different among different SL LCHs, SLRBs or destination IDs.

In one embodiment, a (pre-)configuration for enabling or disabling SL HARQ-ACK could be used (or applied) for MAC CE(s) comprising SL reports (e.g., SL CSI-report, SL RSRP-report). The (pre-)configuration for MAC CE(s) could also be applied (or used) for all type of MAC CE delivering SL CSI-report or delivering SL RSRP report. Among the MAC CE(s), at least one MAC CE could deliver or carry SL CSI-report. In one embodiment, at least one MAC CE could deliver or carry SL RSRP report.

The first device could multiplex same (pre-)configuration for enabling or disabling for SL HARQ-ACK for MAC CE(s) and for (LCH) data in the first sidelink transmission. In case the first sidelink transmission comprising MAC CE(s) only (without (LCH) data), the first device could multiplex MAC CE(s) in the first sidelink transmission. This may be feasible since all MAC CE(s) for SL report is (pre-)configured with same enabling or disabling SL HARQ-ACK.

Additionally or alternatively, (pre-)configuration for MAC CE delivering SL CSI-report could be separated from (pre-)configuration for MAC CE delivering SL RSRP report. In other words, MAC CE delivering SL CSI-report and MAC CE delivering SL RSRP report may indicate same or different enabling or disabling SL HARQ-ACKs.

In case the first sidelink transmission comprising MAC CE(s) only (without (LCH) data), the first device may not be allowed or prevented to multiplex the MAC CE(s) with different enabling or disabling SL HARQ-ACK in the first sidelink transmission. Additionally and/or alternatively, the MAC CE for delivering SL report (e.g., SL CSI-report, SL RSRP report) may not require SL HARQ-ACK. The first device may consider the MAC CE delivering or comprising SL report disable or not support SL HARQ-ACK. The first device may also consider the MAC CE delivering or comprising SL report may not need retransmission. The first device may not be allowed or prevented to multiplex the MAC CE with (LCH) data which (pre-)configuration enables SL HARQ-ACK. The first device may transmit the MAC CE on a second sidelink transmission comprising (LCH) data and/or MAC CE(s) which (pre-)configuration disables SL HARQ-ACK. The second sidelink transmission may comprise the MAC CE and (LCH) data or the MAC CE only. The first device may (only) be allowed or multiplex the MAC CE with (LCH) data with disabling SL HARQ-ACK.

The first device could transmit the first sidelink transmission to a second device. For the first sidelink transmission comprising (LCH) data and/or MAC CE(s) with enabling SL HARQ-ACK, the first device could indicate enabling SL HARQ-ACK in SCI which schedules the first sidelink transmission. For the first sidelink transmission comprising (LCH) data and/or MAC CE(s) with disabling SL HARQ-ACK, the first device could indicate disabling SL HARQ-ACK in SCI which schedules the first sidelink transmission. The second device may determine whether to transmit SL HARQ-ACK associated to the first sidelink transmission based on indication of the scheduling SCI. The second device would indicate or trigger the first UE to transmit SL CSI-report.

Concept 2: If MAC PDU Comprises MAC CE Only, Follows Disable or (Pre-)Configuration for the MAC CE, Otherwise Follows (Pre-)Configuration for Data Another general concept of the invention is that a first device determines whether to indicate enabling/disabling SL HARQ-ACK in a scheduling SCI for scheduling a first sidelink transmission based on content delivered by the first sidelink transmission. In one embodiment, the content could be either (LCH) data multiplexed with MAC CE(s) or MAC CE(s) only.

In case the first sidelink transmission comprising a set of MAC CE with (LCH) data, the first device may indicate whether to enable or disable SL HARQ-ACK for the first sidelink transmission based on consideration of SL HARQ-ACK (SL HARQ-ACK behavior) for the (LCH) data. The first device may not indicate enable or disable SL HARQ-ACK for the first sidelink transmission based on consideration of SL HARQ-ACK (SL HARQ-ACK behavior) for each/a MAC CE in the set of MAC CE. The first device may indicate enable or disable SL HARQ-ACK for the first sidelink transmission based on consideration of (LCH) data regardless of enabling or disabling SL HARQ-ACK for each/a MAC CE in the set of MAC CE. In other words, the set of MAC CE can be multiplexed with (LCH) data with enabling SL HARQ-ACK regardless of enabling or disabling SL HARQ-ACK for each MAC CE in the set of MAC CE. The set of MAC CE can be multiplexed with (LCH) data with disabling SL HARQ-ACK regardless of enabling or disabling SL HARQ-ACK for each MAC CE in the set of MAC CE.

In one embodiment, the consideration of SL HARQ-ACK (SL HARQ-ACK behavior) for the (LCH) data could be derived from indication of (pre-)configuration for enabling or disabling SL HARQ-ACK for the (LCH) data. For a MAC CE in the set of MAC CE, consideration of SL HARQ-ACK (SL HARQ-ACK behavior) for the MAC CE could be the same or different as the consideration of SL HARQ-ACK (SL HARQ-ACK behavior) for the (LCH) data. In other words, (pre-)configuration for the MAC CE and (pre-)configuration for the (LCH) data indicates same or different enable or disable SL HARQ-ACK.

For example, when performing logical channel prioritization (LCP) procedure, the first device could multiplex one or more MAC CE(s) and SL data from one or more SL LCHs in a MAC PDU. The MAC PDU may be associated with enabling SL HARQ-ACK if the SL data from one or more SL LCHs is associated with enabling SL HARQ-ACK. Additionally or alternatively, the MAC PDU may be associated with disabling SL HARQ-ACK if the SL data from one or more SL LCHs is associated with disabling SL HARQ-ACK. The one or more MAC CE(s) could be associated with either enabling or disabling (or both or neither) SL HARQ-ACK.

In case the first sidelink transmission comprising MAC CE(s) only (without (LCH) data), the first device may indicate whether to enable or disable SL HARQ-ACK for the first sidelink transmission based on a consideration of SL HARQ-ACK (SL HARQ-ACK behavior) for a MAC CE among the MAC CE(s) or a consideration of SL HARQ-ACK (SL HARQ-ACK behavior) for MAC CE(s). In one embodiment, the consideration of SL HARQ-ACK (SL HARQ-ACK behavior) for the MAC CE(s) could be derived from indication of (pre-)configuration of the MAC CE(s). In other words, a (common) (pre-)configuration or a common enabling/disabling configuration for the MAC CE(s).

Alternatively, considering different enabling or disabling SL HARQ-ACK for the MAC CE(s), the consideration of SL HARQ-ACK (SL HARQ-ACK behavior) for the MAC CE(s) could be derived from the highest priority MAC CE. In other words, if (pre-)configuration of the highest priority MAC CE indicates enable SL HARQ-ACK, the first device would indicate enable SL HARQ-ACK for the first sidelink transmission. If (pre-)configuration of the highest priority MAC CE indicates disable SL HARQ-ACK, the first device would indicate disable SL HARQ-ACK for the first sidelink transmission.

Alternatively, the consideration of SL HARQ-ACK (SL HARQ-ACK behavior) for the MAC CE(s) could be derived from the MAC CE delivering SL CSI-report, or from the MAC CE delivering SL RSRP report. Alternatively, the consideration of SL HARQ-ACK (SL HARQ-ACK behavior) for the MAC CE(s) could be derived based on whether there is any MAC CE enabling SL HARQ-ACK or not. If there is at least one MAC CE (among the MAC CE(s)) enabling SL HARQ-ACK, the first device would indicate enable SL HARQ-ACK for the first sidelink transmission; if there is no MAC CE (among the MAC CE(s)) enabling SL HARQ-ACK, the first device would indicate disable SL HARQ-ACK for the first sidelink transmission. Alternatively, the consideration of SL HARQ-ACK (SL HARQ-ACK behavior) for the MAC CE(s) could be derived based on whether CBR is higher/lower than a threshold. If the first device performs sidelink transmission in a congested resource pool, the first device may not require for SL HARQ-ACK.

Alternatively, the consideration of SL HARQ-ACK (SL HARQ-ACK behavior) for the MAC CE(s) could be always disable. The motivation would be there is no need for (HARQ feedback-based) retransmission for SL CSI-report and/or SL RSRP report. The SL CSI-report and/or SL RSRP report may represent channel condition and could be latency-sensitive. Retransmission may not be necessary. In one embodiment, the first device would indicate disable SL HARQ-ACK for the first sidelink transmission.

The first device may transmit the first sidelink transmission to a second device. The second device may determine whether to transmit SL HARQ-ACK associated to the first sidelink transmission based on indication of the scheduling SCI for the first sidelink transmission. The second device may indicate or trigger the first UE to transmit a SL CSI-report.

In one embodiment, when assembling a transport block (TB), a first device could first include a MAC CE and include (and/or followed by) sidelink data associated with one or more sidelink logical channels after including the MAC CE. The MAC CE may have higher priority than the sidelink data.

The HARQ-ACK behavior associated with the MAC CE(s) could be disabling SL HARQ-ACK. Additionally or alternatively, the HARQ-ACK behavior associated with the MAC CE(s) could be enabling SL HARQ-ACK. The HARQ-ACK behavior associated with the sidelink data and/or one or more sidelink logical channels could be enabling SL HARQ-ACK. Additionally or alternatively, the HARQ-ACK behavior associated with the sidelink data and/or one or more sidelink logical channels could be disabling SL HARQ-ACK.

In one embodiment, the HARQ-ACK behavior associated with the MAC CE(s) could be disabling SL HARQ-ACK, and the HARQ-ACK behavior associated with the sidelink data and/or one or more sidelink logical channels could be enabling SL HARQ-ACK. The HARQ-ACK behavior associated with the MAC CE(s) could also be enabling SL HARQ-ACK, and the HARQ-ACK behavior associated with the sidelink data and/or one or more sidelink logical channels could be disabling SL HARQ-ACK. The MAC CE(s) could be associated with SL CSI-report and/or SL RSRP report.

The first device could transmit the TB to a second device. The first device could determine whether to enable sidelink HARQ-ACK of the TB based on the HARQ-ACK behavior of the sidelink data. The first device may not determine whether to enable sidelink HARQ-ACK of the TB based on the HARQ-ACK behavior of the MAC CE(s). The first device could transmit a SCI associated with or scheduling the TB to the second device indicating the second device to transmit a HARQ feedback in response to the TB and/or the SCI. The second device could transmit a SL HARQ feedback (e.g. ACK or NACK) in response to the TB and/or the SCI.

In another embodiment, when assembling a transport block (TB), a first device could first include sidelink data associated with (and/or followed by) one or more sidelink logical channels and include a MAC CE after including the sidelink data. The sidelink data (included before the MAC CE) may have higher priority than the MAC CE. The HARQ-ACK behavior associated with the MAC CE(s) could be disabling SL HARQ-ACK. Additionally or alternatively, the HARQ-ACK behavior associated with the MAC CE(s) could be enabling SL HARQ-ACK.

The HARQ-ACK behavior associated with the sidelink data and/or one or more sidelink logical channels could be enabling SL HARQ-ACK. Additionally or alternatively, the HARQ-ACK behavior associated with the sidelink data and/or one or more sidelink logical channels could be disabling SL HARQ-ACK.

In one embodiment, the HARQ-ACK behavior associated with the sidelink data and/or one or more sidelink logical channels could be enabling SL HARQ-ACK, and the HARQ-ACK behavior associated with the MAC CE(s) could be disabling SL HARQ-ACK. Alternatively, the HARQ-ACK behavior associated with the sidelink data and/or one or more sidelink logical channels could be disabling SL HARQ-ACK, and the HARQ-ACK behavior associated with the MAC CE(s) could be enabling SL HARQ-ACK. The MAC CE could be associated with SL CSI-report and/or SL RSRP report.

The first device could determine whether to enable sidelink HARQ-ACK of the TB at least based on the HARQ-ACK behavior of the sidelink data. The first device may not determine whether to enable sidelink HARQ-ACK of the TB based on the HARQ-ACK behavior of the MAC CE(s).

For all Above Concepts, Methods, Alternatives and Embodiments:

The first sidelink transmission could be transmitted via PC5 interface. The second sidelink transmission could be transmitted via PC5 interface. The first sidelink transmission could be via PSSCH. The second sidelink transmission could be via PSSCH.

A base station could be a network (NW), gNB, or eNB. The first device could be a UE or a vehicle UE. The second device could be a UE or a vehicle UE. The first device could be (pre-)configured in the base station scheduling mode for sidelink transmission (e.g., NR sidelink resource allocation mode-1). The first device could be (pre-)configured to perform resource selection autonomously for sidelink transmission (e.g., NR sidelink resource allocation mode-2). The first device could also be (pre-)configured to perform sidelink transmission based on scheduling from the base station.

In one embodiment, the first sidelink transmission from the first device to the second device could be unicast or groupcast. The second sidelink transmission from the first device to the second device could be unicast or groupcast.

In one embodiment, a sidelink transmission is unicast may imply that only peer or pair device could receive and/or decode successfully the sidelink transmission. A sidelink transmission is unicast may also imply that the sidelink transmission includes or indicates an ID (Identity) for the pair or peer device (e.g., L1/L2-destination ID).

In one embodiment, a sidelink transmission is groupcast may imply that only devices in a (sidelink) group could receive and/or decode successfully the sidelink transmission. A sidelink transmission is groupcast may imply that the sidelink transmission includes or indicates an ID for the group.

The (SL) data could be associated with a sidelink logical channel, a sidelink radio bearer (RB), and/or a destination identity. The (SL) data could also be associated with a SL HARQ-ACK behavior. The (LCH) data could be associated with (e.g., from) one or more sidelink logical channels.

The MAC CE(s) could be associated (e.g. configured by a network or preconfigured) with a SL HARQ-ACK behavior. Additionally or alternatively, the MAC CE(s) may not be associated (e.g. not configured by a network) with one SL HARQ-ACK behavior. The SL HARQ-ACK behavior could be enabling SL HARQ-ACK or disabling SL HARQ-ACK.

When the (SL) LCH/data/MAC CE(s) is associated with enabling SL HARQ-ACK, the first device could indicate a second device to transmit SL HARQ-ACK (e.g. ACK or NACK) in response to receiving the (SL) data associated with the (SL) LCH, (SL) data, or (SL) MAC CE(s). When the (SL) LCH/data/MAC CE(s) is associated with disabling SL HARQ-ACK, the first device could indicate a second device to not transmit SL HARQ-ACK (e.g. ACK or NACK) in response to receiving the (SL) data associated with the (SL) LCH, (SL) data, or (SL) MAC CE(s).

The first device could be triggered or indicated by the second device to transmit SL CSI-report and/or SL RSRP report. The SL CSI-report could be triggered or indicated in same or different time, slot, or resource from the SL RSRP report. The SL CSI-report could be derived or measured from reference signal(s) in the second sidelink transmission. The reference signal(s) could be CSI-RS (Channel State Information-Reference Signal) or DMRS (Demodulation Reference Signal) of PSCCH or PSSCH for the second sidelink transmission.

The first device could derive setting a bit field in a SCI scheduling the first sidelink transmission based on the SL HARQ-ACK behavior. If the SL HARQ-ACK behavior for the first sidelink transmission is enabling SL HARQ-ACK, the first device could set the bit field in the SCI as enabling. If the SL HARQ-ACK behavior for the first sidelink transmission is disabling SL HARQ-ACK, the first device could set the bit field in the SCI as disabling.

The second device may determine whether to perform SL HARQ-ACK for the first sidelink transmission at least based on the indication of the bit field. The first report and/or the second report could be carried by MAC CE or RRC signaling. The first device may have a unicast link with the second device via PC5 interface. The first sidelink transmission could be unicast.

Any of above methods, alternatives and embodiments may be combined or applied simultaneously.

Figure 9:
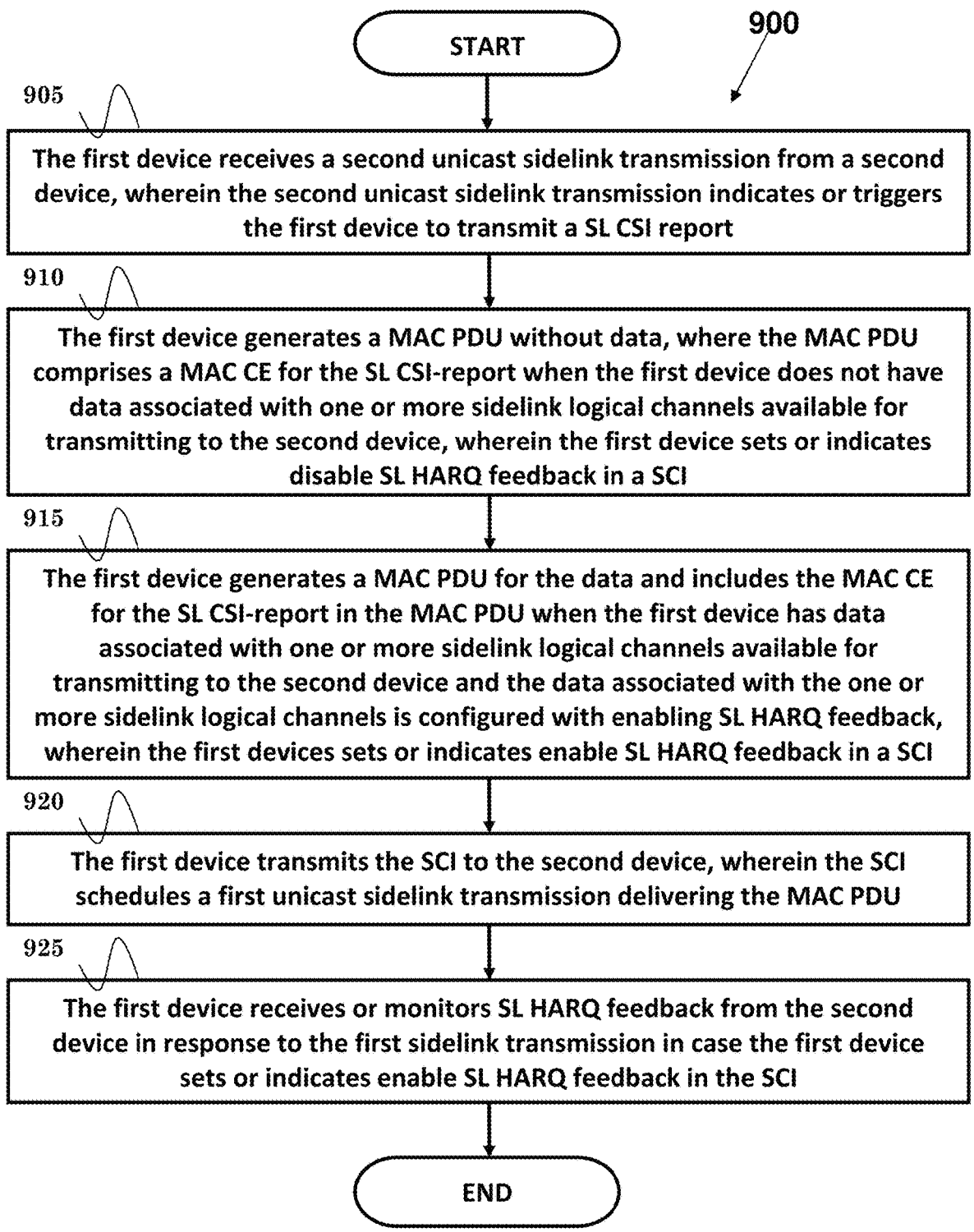
FIG. 9 is a flow chart according to one exemplary embodiment.

FIG. 9 is a flow chart 900 according to one exemplary embodiment from the perspective of a first device for performing sidelink communication. In step 905, the first device receives a second (unicast) sidelink transmission from a second device, wherein the second (unicast) sidelink transmission indicates or triggers the first device to transmit a SL CSI report. In step 910, the first device generates a MAC PDU without data, where the MAC PDU comprises a MAC CE for the SL CSI-report when the first device does not have data associated with one or more sidelink logical channels available for transmitting to the second device, wherein the first device sets or indicates disable SL HARQ feedback in a SCI. In step 915, the first device generates a MAC PDU for the data and includes the MAC CE for the SL CSI-report in the MAC PDU when the first device has data associated with one or more sidelink logical channels available for transmitting to the second device and the data associated with the one or more sidelink logical channels is configured with enabling SL HARQ feedback, wherein the first devices sets or indicates enable SL HARQ feedback in a SCI. In step 920, the first device transmits the SCI to the second device, wherein the SCI schedules a first (unicast) sidelink transmission delivering the MAC PDU. In step 925, the first device receives or monitors SL HARQ feedback from the second device in response to the first (unicast) sidelink transmission in case the first device sets or indicates enable SL HARQ feedback in the SCI.

In one embodiment, when the first device generates the MAC PDU for the data associated with the one or more sidelink logical channels configured with enabling SL HARQ feedback, the first device may not include data associated with one or more sidelink logical channels configured with disabling SL HARQ feedback in the MAC PDU. The MAC CE may be considered as no configuration for enable or disable SL HARQ feedback.

Referring back to FIGS. 3 and 4, in one exemplary embodiment of a first device for performing sidelink communication. The first device 300 includes a program code 312 stored in the memory 310. The CPU 308 could execute program code 312 to enable the first device (i) to receive a second (unicast) sidelink transmission from a second device, wherein the second (unicast) sidelink transmission indicates or triggers the first device to transmit a SL CSI report, (ii) to generate a MAC PDU without data, where the MAC PDU comprises a MAC CE for the SL CSI-report when the first device does not have data associated with one or more sidelink logical channels available for transmitting to the second device, wherein the first device sets or indicates disable SL HARQ feedback in a SCI, (iii) to generate a MAC PDU for the data and includes the MAC CE for the SL CSI-report in the MAC PDU when the first device has data associated with one or more sidelink logical channels available for transmitting to the second device and the data associated with the one or more sidelink logical channels is configured with enabling SL HARQ feedback, wherein the first devices sets or indicates enable SL HARQ feedback in a SCI, (iv) to transmit the SCI to the second device, wherein the SCI schedules a first (unicast) sidelink transmission delivering the MAC PDU, and (v) to receive or monitor SL HARQ feedback from the second device in response to the first (unicast) sidelink transmission in case the first device sets or indicates enable SL HARQ feedback in the SCI. Furthermore, the CPU 308 can execute the program code 312 to perform all of the above-described actions and steps or others described herein.

Figure 10:
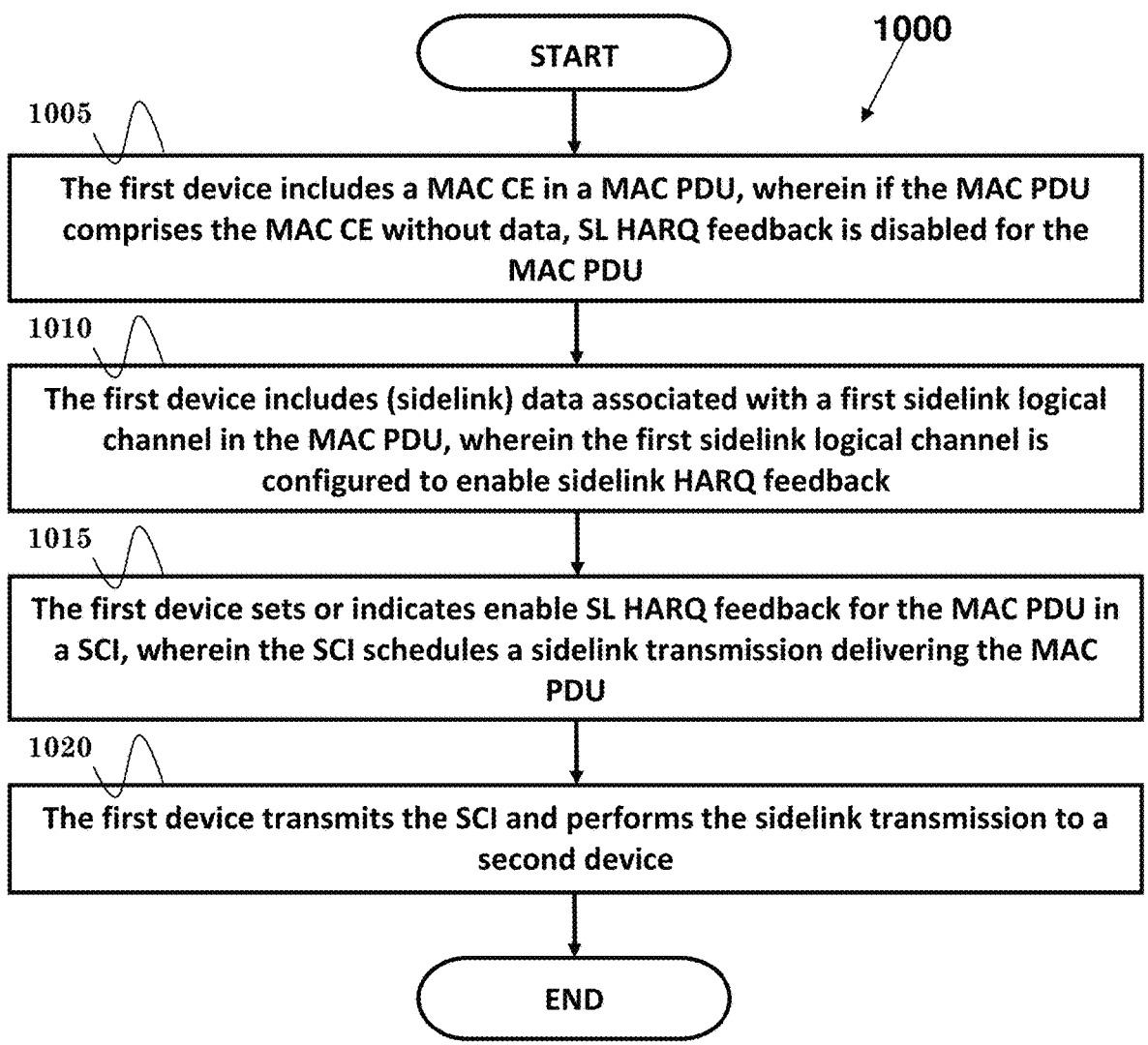
FIG. 10 is a flow chart according to one exemplary embodiment.

FIG. 10 is a flow chart 1000 according to one exemplary embodiment from the perspective of a first device for performing sidelink communication. In step 1005, the first device includes a MAC CE in a MAC PDU, wherein if the MAC PDU comprises the MAC CE without data, SL HARQ feedback is disabled for the MAC PDU. In step 1010, the first device includes (sidelink) data associated with a first sidelink logical channel in the MAC PDU, wherein the first sidelink logical channel is configured to enable sidelink HARQ feedback. In step 1015, the first device sets or indicates enable SL HARQ feedback for the MAC PDU in a SCI, wherein the SCI schedules a sidelink transmission delivering the MAC PDU. In step 1020, the first device transmits the SCI and performs the sidelink transmission to a second device.

In one embodiment, when the MAC PDU is associated with enabling SL HARQ feedback, the second device could transmit a HARQ feedback in response to the sidelink transmission associated with the MAC PDU. When the MAC PDU is associated with disabling SL HARQ feedback, the second device may not transmit a HARQ feedback in response to the sidelink transmission associated with the MAC PDU.

In one embodiment, the first device could receive a second (unicast) sidelink transmission from the second device, wherein the second (unicast) sidelink transmission indicates, triggers, or requests the first device to transmit a SL CSI report. The SL CSI report could be delivered by the MAC CE. The first device may not include (sidelink) data associated with a second sidelink logical channel in the MAC PDU, and the second sidelink logical channel could be configured to disable or not enable sidelink HARQ feedback. The MAC CE may not have a configuration for enable or disable SL HARQ feedback.

Referring back to FIGS. 3 and 4, in one exemplary embodiment of a first device for performing sidelink communication. The first device 300 includes a program code 312 stored in the memory 310. The CPU 308 could execute program code 312 to enable the first device (i) to include a MAC CE in the MAC PDU, wherein if the MAC PDU comprises the MAC CE without data, SL HARQ feedback is disabled for the MAC PDU, (ii) to include (sidelink) data associated with a first sidelink logical channel in the MAC PDU, wherein the first sidelink logical channel is configured to enable sidelink HARQ feedback, (iii) to set or indicate enable SL HARQ feedback for the MAC PDU in a SCI, wherein the SCI schedules a sidelink transmission delivering the MAC PDU, and (iv) to transmit the SCI and perform the sidelink transmission to a second device. Furthermore, the CPU 308 can execute the program code 312 to perform all of the above-described actions and steps or others described herein.

Figure 11:
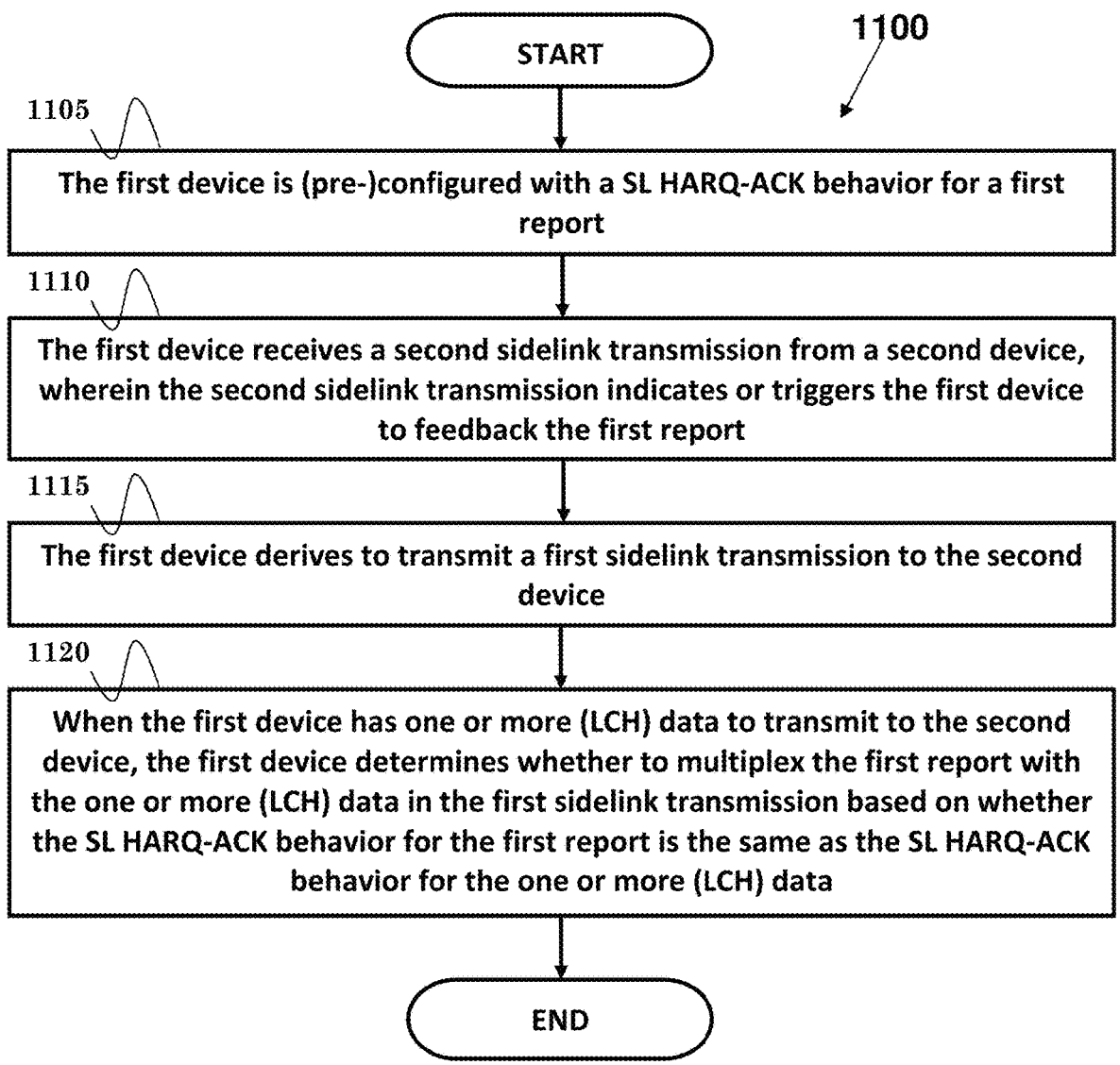
FIG. 11 is a flow chart according to one exemplary embodiment.

FIG. 11 is a flow chart 1100 according to one exemplary embodiment from the perspective of a first device for performing sidelink communication. In step 1105, the first device is (pre-)configured with a SL HARQ-ACK behavior for a first report. In step 1110, the first device receives a second sidelink transmission from a second device, wherein the second sidelink transmission indicates/triggers the first device to feedback the first report. In step 1115, the first device derives to transmit a first sidelink transmission to the second device. In step 1120, when the first device has one or more (LCH) data to transmit to the second device, the first device determines whether to multiplex the first report with the one or more (LCH) data in the first sidelink transmission based on whether the SL HARQ-ACK behavior for the first report is the same as the SL HARQ-ACK behavior for the one or more (LCH) data.

In one embodiment, the one or more (LCH) data could be associated to or (pre-)configured with same SL HARQ-ACK behavior. The first device could multiplex the first report with the one or more (LCH) data in case the same SL HARQ-ACK behavior for the first report and the one or more (LCH) data. The first device may not multiplex the first report with the one or more (LCH) data in case different SL HARQ-ACK behavior for the first report and the one or more (LCH) data. In case different of SL HARQ-ACK behavior for the first report and the one or more (LCH) data, the first device could transmit a third sidelink transmission delivering the first report.

In one embodiment, the first device could be triggered or indicated by the second device to transmit a second report. When the first device does not have (LCH) data to the second device, the first device could determine whether to multiplex the first report and the second report in the first sidelink transmission based on whether the first report and the second report are associated with a same SL HARQ-ACK behavior.

In one embodiment, the SL HARQ-ACK behavior for the one or more (LCH) data could be associated to (pre-)configuration of enabling or disabling SL HARQ-ACK for the one or more (LCH) data. The first device could be (pre-)configured (by a network) with a SL HARQ-ACK behavior for each SL LCH, SL radio bearer (RB),destination identity (ID), or (LCH) data.

In one embodiment, the SL HARQ-ACK behavior could be enabling SL HARQ-ACK or disabling SL HARQ-ACK. The same SL HARQ-ACK behavior may imply or mean that same enabling SL HARQ-ACK or same disabling SL HARQ-ACK.

In one embodiment, the first report could be the same or different type as the second report. The first report could be triggered or indicated in different time, slot, or resource from the second report. Alternatively, the first report could be triggered or indicated in same time, slot, or resource from the second report. The first report could be SL CSI-report. The second report could be SL RSRP report.

In one embodiment, the first report could be derived or measured from reference signal(s) in the second sidelink transmission. The reference signal(s) could be CSI-RS or DMRS of PSCCH or PSSCH for the second sidelink transmission.

In one embodiment, the first device could derive to set a bit field in a SCI scheduling the first sidelink transmission based on the SL HARQ-ACK behavior. If the SL HARQ-ACK behavior for the first sidelink transmission is enabling SL HARQ-ACK, the first device could set the bit field in the SCI as enabling. If the SL HARQ-ACK behavior for the first sidelink transmission is disabling SL HARQ-ACK, the first device could set the bit field in the SCI as disabling.

In one embodiment, the second device could determine whether to perform SL HARQ-ACK for the first sidelink transmission at least based on the indication of the bit field. The first report and/or the second report may be carried by MAC CE or RRC signaling. The first device may have an unicast link with the second device via PC5 interface. The first sidelink transmission could be unicast.

Referring back to FIGS. 3 and 4, in one exemplary embodiment of a first device for performing sidelink communication, wherein the first device is (pre-)configured with a SL HARQ-ACK behavior for a first report. The first device 300 includes a program code 312 stored in the memory 310. The CPU 308 could execute program code 312 to enable the first device (i) to receive a second sidelink transmission from a second device, wherein the second sidelink transmission indicates or triggers the first device to feedback the first report, (ii) to derive to transmit a first sidelink transmission to the second device, and (iii) to determines, when the first device has one or more (LCH) data to transmit to the second device, whether to multiplex the first report with the one or more (LCH) data in the first sidelink transmission based on whether the SL HARQ-ACK behavior for the first report is the same as the SL HARQ-ACK behavior for the one or more (LCH) data. Furthermore, the CPU 308 can execute the program code 312 to perform all of the above-described actions and steps or others described herein.

Figure 12:
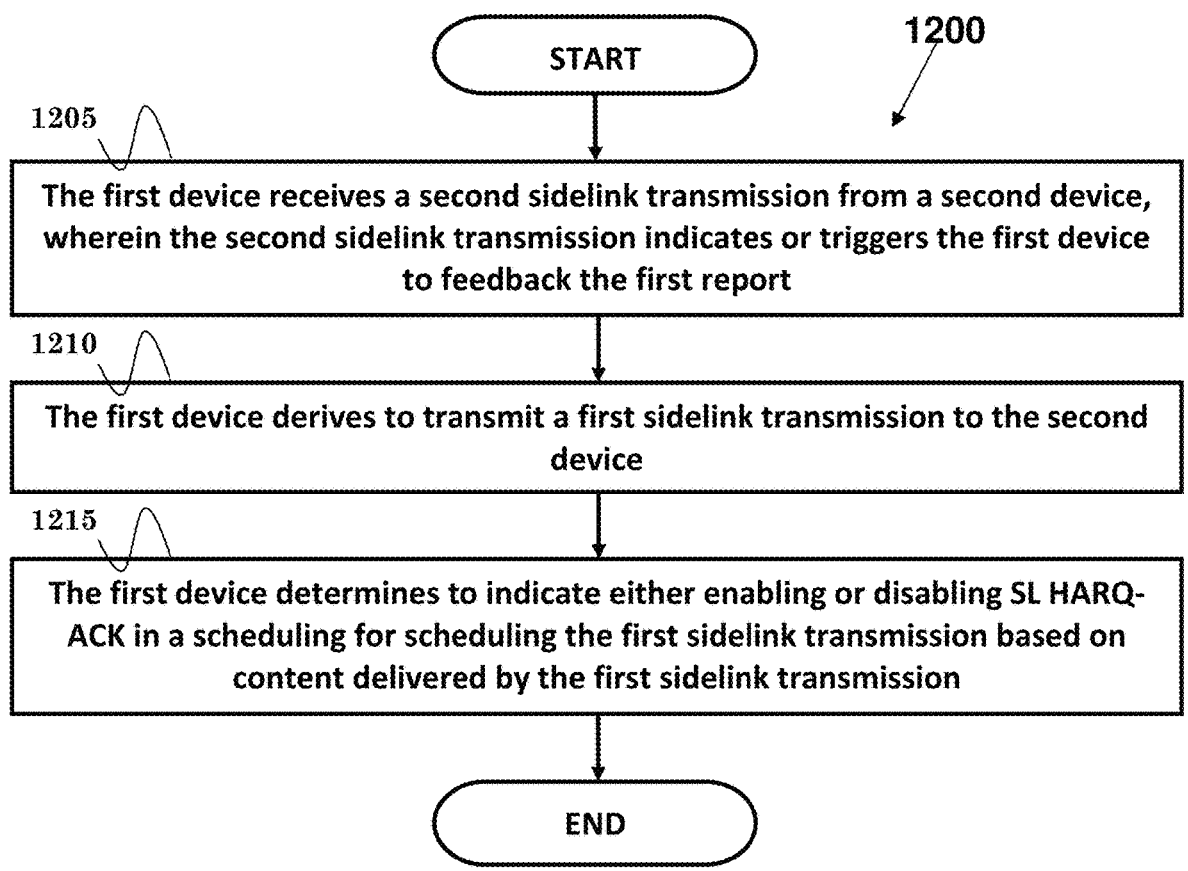
FIG. 12 is a flow chart according to one exemplary embodiment.

FIG. 12 is a flow chart 1200 according to one exemplary embodiment from the perspective of a first device for performing sidelink communication. In step 1205, the first device receives a second sidelink transmission from a second device, wherein the second sidelink transmission indicates or triggers the first device to feedback the first report. In step 1210, the first device derives to transmit a first sidelink transmission to the second device. In step 1215, the first device determines to indicate either enabling or disabling SL HARQ-ACK in a scheduling for scheduling the first sidelink transmission based on content delivered by the first sidelink transmission.

In one embodiment, the content could be either one or more (LCH) data multiplexed with one or multiple report comprising the first report, or only one or more report comprising the first report (without (any) (LCH) data). In case the first sidelink transmission comprises (LCH) data with the one or more report, the first device may indicate whether to enable or disable SL HARQ-ACK for the first sidelink transmission based on consideration of SL HARQ-ACK for the (LCH) data. The first device may not indicate enable or disable SL HARQ-ACK for the first sidelink transmission based on consideration of SL HARQ-ACK (SL HARQ-ACK behavior) for each report in the one or more reports nor for the first report. The first device may indicate enable or disable SL HARQ-ACK for the first sidelink transmission based on consideration of (LCH) data regardless of enabling or disabling SL HARQ-ACK for each/a report in the one or more report or the first report. In case the first sidelink transmission comprises only the one or more report comprising the first report (without (LCH) data), the first device could indicate whether to enable or disable SL HARQ-ACK for the first sidelink transmission based on the consideration of SL HARQ-ACK (SL HARQ-ACK behavior) for the first report.

In one embodiment, the first device could be (pre-) configured with a SL HARQ-ACK behavior for a first report. Considering different enabling or disabling SL HARQ-ACK for the one or more reports, the consideration of SL HARQ-ACK (SL HARQ-ACK behavior) for the one or more reports could be derived from the highest priority MAC CE or MAC CE delivering SL CSI-report, or MAC CE delivering SL RSRP report, or whether there is any MAC CE enabling SL HARQ-ACK or not. If there is at least one MAC CE enabling SL HARQ-ACK, the first device would indicate enable SL HARQ-ACK for the first sidelink transmission. If there is no MAC CE enabling SL HARQ-ACK, the first device would indicate disable SL HARQ-ACK for the first sidelink transmission. The SL HARQ-ACK behavior for the one or more (LCH) data could be associated to (pre-) configuration of enabling or disabling SL HARQ-ACK for the one or more (LCH) data.

In one embodiment, the first device could be (pre-) configured (by a network) with a SL HARQ-ACK behavior for each SL LCH, SL radio bearer (RB), destination identity (ID), or (LCH) data. The SL HARQ-ACK behavior could be enabling SL HARQ-ACK or disabling SL HARQ-ACK. The same SL HARQ-ACK behavior could imply or mean that same enabling SL HARQ-ACK or same disabling SL HARQ-ACK.

In one embodiment, the first report could be the same or different type as the second report. The first report could be triggered or indicated in different time, slot, or resource from the second report. Alternatively, the first report could be triggered or indicated in same time, slot, or resource from the second report. The first report could be SL CSI-report. The second report could be SL RSRP report. The first report could be derived or measured from reference signal(s) in the second sidelink transmission.

In one embodiment, the reference signal(s) could be CSI-RS or DMRS of PSCCH or PSSCH for the second sidelink transmission. The first device could derive to set a bit field in a SCI scheduling the first sidelink transmission based on the SL HARQ-ACK behavior. If the SL HARQ-ACK behavior for the first sidelink transmission is enabling SL HARQ-ACK, the first device could set the bit field in the SCI as enabling. If the SL HARQ-ACK behavior for the first sidelink transmission is disabling SL HARQ-ACK, the first device could set the bit field in the SCI as disabling.

In one embodiment, the second device could determine whether to perform SL HARQ-ACK for the first sidelink transmission at least based on the indication of the bit field. The first report and/or the second report could be carried by MAC CE or RRC signaling. The first device may have an unicast link with the second device via PC5 interface. The first sidelink transmission could be unicast.

Referring back to FIGS. 3 and 4, in one exemplary embodiment of a first device for performing sidelink communication. The first device 300 includes a program code 312 stored in the memory 310. The CPU 308 could execute program code 312 to enable the first device (i) to receive a second sidelink transmission from a second device, wherein the second sidelink transmission indicates or triggers the first device to feedback the first report, (ii) to derive to transmit a first sidelink transmission to the second device, and (iii) to determine to indicate either enabling or disabling SL HARQ-ACK in a scheduling for scheduling the first sidelink transmission based on content delivered by the first sidelink transmission. Furthermore, the CPU 308 can execute the program code 312 to perform all of the above-described actions and steps or others described herein.

Figure 13:
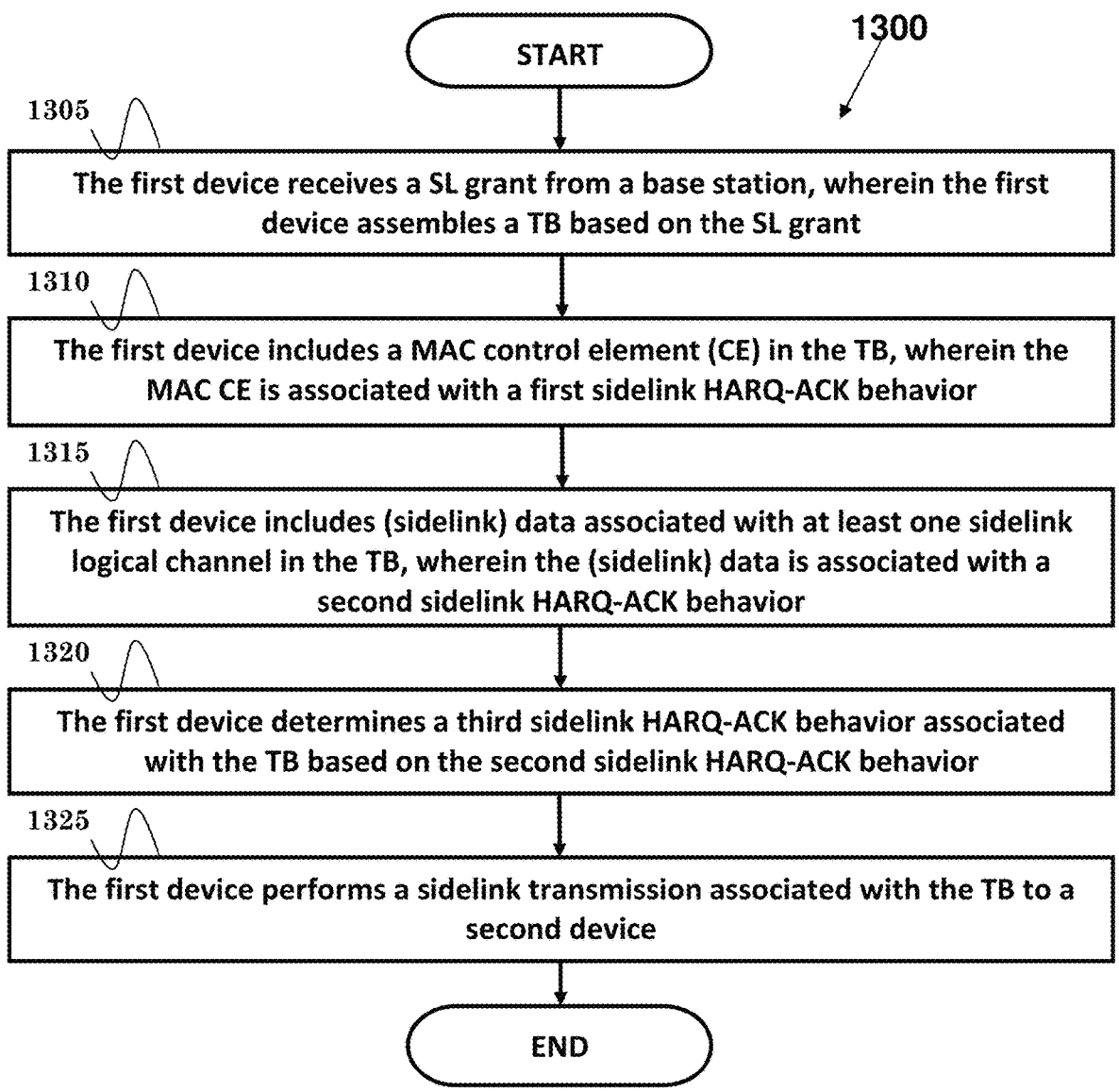
FIG. 13 is a flow chart according to one exemplary embodiment.

FIG. 13 is a flow chart 1300 according to one exemplary embodiment from the perspective of a first device for performing sidelink communication. In step 1305, the first device receives a SL grant from a base station, wherein the first device assembles a TB based on the SL grant. In step 1310, the first device includes a MAC CE in the TB, wherein the MAC CE is associated with a first sidelink HARQ-ACK behavior. In step 1315, the first device includes (sidelink) data associated with at least one sidelink logical channel in the TB, wherein the (sidelink) data is associated with a second sidelink HARQ-ACK behavior. In step 1320, the first device determines a third sidelink HARQ-ACK behavior associated with the TB based on the second sidelink HARQ-ACK behavior. In step 1325, the first device performs a sidelink transmission associated with the TB to a second device.

In one embodiment, the first sidelink HARQ-ACK behavior could be different from the second sidelink HARQ-ACK behavior. The third sidelink HARQ-ACK behavior could be the same as the second sidelink HARQ-ACK behavior. The first device may not determine the third sidelink HARQ-ACK behavior based on the first sidelink HARQ-ACK behavior.

In one embodiment, the first, second, or third sidelink HARQ-ACK behavior could be enabling sidelink HARQ-ACK. Alternatively, the first, second, or third sidelink HARQ-ACK behavior could be disabling sidelink HARQ-ACK.

In one embodiment, when the TB is associated with enabling sidelink HARQ-ACK, the second device could transmit a HARQ feedback in response to the sidelink transmission associated with the TB. When the TB is associated with disabling sidelink HARQ-ACK, the second device may not transmit a HARQ feedback in response to the sidelink transmission associated with the TB. The sidelink transmission may contain a SCI indicating the third sidelink HARQ-ACK behavior to the second device.

Referring back to FIGS. 3 and 4, in one exemplary embodiment of a first device for performing sidelink communication. The first device 300 includes a program code 312 stored in the memory 310. The CPU 308 could execute program code 312 to enable the first device (i) to receive a SL grant from a base station, wherein the first device assembles a TB based on the SL grant, (ii) to include a MAC control element (CE) in the TB, wherein the MAC CE is associated with a first sidelink HARQ-ACK behavior, (iii) to include (sidelink) data associated with at least one sidelink logical channel in the TB, wherein the (sidelink) data is associated with a second sidelink HARQ-ACK behavior, (iv) to determine a third sidelink HARQ-ACK behavior associated with the TB based on the second sidelink HARQ-ACK behavior, and (v) to perform a sidelink transmission associated with the TB to a second device. Furthermore, the CPU 308 can execute the program code 312 to perform all of the above-described actions and steps or others described herein.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method of a first device to perform sidelink communication, comprising:
   the first device receives a second unicast sidelink transmission from a second device, wherein the second unicast sidelink transmission indicates or triggers the first device to transmit a Sidelink (SL) Channel State Information (CSI) report;
   the first device generates a Medium Access Control (MAC) Protocol Data Unit (PDU) without data where the MAC PDU comprises a MAC Control Element (CE) for the SL CSI-report, and the first device sets or indicates disable SL Hybrid Automatic Repeat Request (HARQ) feedback in a SCI when the first device does not have data associated with one or more sidelink logical channels available for transmitting to the second device;

the first device generates a MAC PDU for the data and includes the MAC CE for the SL CSI-report in the MAC PDU, and the first device sets or indicates enable SL HARQ feedback in a SCI when the first device has data associated with one or more sidelink logical channels available for transmitting to the second device and the data is associated with the one or more sidelink logical channels configured with enabling SL HARQ feedback;

the first device transmits the SCI to the second device, wherein the SCI schedules a first unicast sidelink transmission delivering the MAC PDU; and the first device receives or monitors SL HARQ feedback from the second device in response to the first unicast sidelink transmission in case the first device sets or indicates enable SL HARQ feedback in the SCI.

2. The method of claim 1, wherein when the first device generates the MAC PDU for the data associated with the one or more sidelink logical channels configured with enabling SL HARQ feedback, the first device does not include data associated with one or more sidelink logical channels configured with disabling SL HARQ feedback in the MAC PDU.

3. The method of claim 1, wherein the MAC CE is considered as no configuration for enable or disable SL HARQ feedback.

4. A method of a first device to perform sidelink transmission, comprising:

the first device includes a Medium Access Control (MAC) Control Element (CE) in a MAC Protocol Data Unit (PDU), wherein when the MAC PDU comprises the MAC CE without data, Sidelink (SL) Hybrid Automatic Repeat Request (HARQ) feedback is disabled for the MAC PDU;

the first device includes (sidelink) data associated with a first sidelink logical channel in the MAC PDU, wherein the first sidelink logical channel is configured to enable sidelink HARQ feedback;

the first device sets or indicates enable SL HARQ feedback for the MAC PDU in a SCI, wherein the SCI schedules a sidelink transmission delivering the MAC PDU; and the first device transmits the SCI and performs the sidelink transmission to a second device.

5. The method of claim 4, wherein when the MAC PDU is associated with enabling SL HARQ feedback, the second device transmits a HARQ feedback in response to the sidelink transmission associated with the MAC PDU.

6. The method of claim 4, wherein when the MAC PDU is associated with disabling SL HARQ feedback, the second device does not transmit a HARQ feedback in response to the sidelink transmission associated with the MAC PDU.

7. The method of claim 4, wherein the first device receives a second unicast sidelink transmission from the second device, wherein the second unicast sidelink transmission indicates, triggers, or requests the first device to transmit a SL CSI report.

8. The method of claim 7, wherein the SL CSI report is delivered by the MAC CE.

9. The method of claim 4, wherein the first device does not include sidelink data associated with a second sidelink logical channel in the MAC PDU, and the second sidelink logical channel is configured to disable or not enable sidelink HARQ feedback.

10. The method of claim 4, wherein the MAC CE has no configuration for enable or disable SL HARQ feedback.

11. A first device, comprising:

a control circuit;

a processor installed in the control circuit; and a memory installed in the control circuit and operatively coupled to the processor;

wherein the processor is configured to execute a program code stored in the memory to:

receive a second unicast sidelink transmission from a second device, wherein the second unicast sidelink transmission indicates or triggers the first device to transmit a Sidelink (SL) Channel State Information (CSI) report;

generate a Medium Access Control (MAC) Protocol Data Unit (PDU) without data, where the MAC PDU comprises a Control Element (MAC CE) for the SL CSI-report and set or indicate disable SL Hybrid Automatic Repeat Request (HARQ) feedback in a SCI when the first device does not have data associated with one or more sidelink logical channels available for transmitting to the second device;

generate a MAC PDU for the data and includes the MAC CE for the SL CSI-report in the MAC PDU and set or indicate enable SL HARQ feedback in a SCI when the first device has data associated with one or more sidelink logical channels available for transmitting to the second device and the data is associated with the one or more sidelink logical channels configured with enabling SL HARQ feedback;

transmit the SCI to the second device, wherein the SCI schedules a first unicast sidelink transmission delivering the MAC PDU; and receive or monitor SL HARQ feedback from the second device in response to the first unicast sidelink transmission in case the first device sets or indicates enable SL HARQ feedback in the SCI.

12. The first device of claim 11, wherein when the first device generates the MAC PDU for the data associated with the one or more sidelink logical channels configured with enabling SL HARQ feedback, the first device does not include data associated with one or more sidelink logical channels configured with disabling SL HARQ feedback in the MAC PDU.

13. The first device of claim 11, wherein the MAC CE is considered as no configuration for enable or disable SL HARQ feedback.

14. A first device, comprising:

a control circuit;

a processor installed in the control circuit; and a memory installed in the control circuit and operatively coupled to the processor;

wherein the processor is configured to execute a program code stored in the memory to:

include a Medium Access Control (MAC) Control Element (CE) in a MAC Protocol Data Unit (PDU), wherein when the MAC PDU comprises the MAC CE without data, Sidelink (SL) Hybrid Automatic Repeat Request (HARQ) feedback is disabled for the MAC PDU;

include sidelink data associated with a first sidelink logical channel in the MAC PDU, wherein the first sidelink logical channel is configured to enable sidelink HARQ feedback;

set or indicate enable SL HARQ feedback for the MAC PDU in a SCI, wherein the SCI schedules a sidelink transmission delivering the MAC PDU; and transmit the SCI and perform the sidelink transmission to a second device.

15. The first device of claim 14, wherein when the MAC PDU is associated with enabling SL HARQ feedback, the second device transmits a HARQ feedback in response to the sidelink transmission associated with the MAC PDU.

16. The first device of claim 14, wherein when the MAC PDU is associated with disabling SL HARQ feedback, the second device does not transmit a HARQ feedback in response to the sidelink transmission associated with the MAC PDU.

17. The first device of claim 14, wherein the first device receives a second unicast sidelink transmission from the second device, wherein the second unicast sidelink transmission indicates, triggers, or requests the first device to transmit a SL CSI report.

18. The first device of claim 17, wherein the SL CSI report is delivered by the MAC CE.

19. The first device of claim 14, wherein the first device does not include sidelink data associated with a second sidelink logical channel in the MAC PDU, and the second sidelink logical channel is configured to disable or not enable sidelink HARQ feedback.

20. The first device of claim 14, wherein the MAC CE has no configuration for enable or disable SL HARQ feedback.

* * * * *